(12) United States Patent
Goodrich et al.

(10) Patent No.: US 11,381,756 B2
(45) Date of Patent: Jul. 5, 2022

(54) DIY EFFECTS IMAGE MODIFICATION

(71) Applicant: Snap Inc., Santa Monica, CA (US)

(72) Inventors: Kyle Goodrich, Venice, CA (US);
Samuel Edward Hare, Los Angeles, CA (US); Maxim Maximov Lazarov, Culver City, CA (US); Tony Mathew, Los Angeles, CA (US); Andrew James McPhee, Culver City, CA (US); Daniel Moreno, Los Angeles, CA (US); Wentao Shang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 164 days.

(21) Appl. No.: 15/929,484

(22) Filed: May 5, 2020

(65) Prior Publication Data

US 2021/0258511 A1    Aug. 19, 2021

Related U.S. Application Data

(60) Provisional application No. 62/976,916, filed on Feb. 14, 2020.

(51) Int. Cl.
*H04N 5/262* (2006.01)
*H04L 51/046* (2022.01)
*H04N 5/272* (2006.01)
*H04L 51/10* (2022.01)

(52) U.S. Cl.
CPC ......... *H04N 5/2621* (2013.01); *H04L 51/046* (2013.01); *H04L 51/10* (2013.01); *H04N 5/2628* (2013.01); *H04N 5/272* (2013.01)

(58) Field of Classification Search
CPC .................................................... H04N 5/2621

USPC ......................................................... 348/239
See application file for complete search history.

(56) References Cited

U.S. PATENT DOCUMENTS

| 8,954,851 | B2 | 2/2015 | Nielsen et al. |
| 2010/0111417 | A1 | 5/2010 | Ward et al. |
| 2014/0237365 | A1 | 8/2014 | Oberbrunner et al. |
| 2015/0067514 | A1* | 3/2015 | Lewis ................... G06F 3/0482 715/720 |
| 2019/0236334 | A1 | 8/2019 | Babushkin |

FOREIGN PATENT DOCUMENTS

WO    2014093713    6/2014

OTHER PUBLICATIONS

"International Application Serial No. PCT/US2021/070142, International Search Report dated Jun. 7, 2021", 4 pgs.
"International Application Serial No. PCT/US2021/070142, Written Opinion dated Jun. 7, 2021", 7 pgs.

* cited by examiner

*Primary Examiner* — Joel W Fosselman
(74) *Attorney, Agent, or Firm* — Schwegman Lundberg & Woessner, P.A.

(57) ABSTRACT

Aspects of the present disclosure involve a system comprising a computer-readable storage medium storing at least one program and method for performing operations comprising: receiving, by a messaging application, an image from a camera of a user device; receiving input that selects a user-customizable effects option for activating a user-customizable effects mode; in response to receiving the input, displaying an array of a plurality of effect options together with the image proximate to the user-customizable effects option; and applying a first effect associated with a first effect option of the plurality of effect options to the image.

20 Claims, 28 Drawing Sheets

US 11,381,756 B2

DIY EFFECTS IMAGE MODIFICATION

CLAIM OF PRIORITY

This application claims the benefit of priority to U.S. Patent Application Ser. No. 62/976,916, filed on Feb. 14, 2020, which is incorporated herein by reference in its entirety.

TECHNICAL FIELD

The present disclosure relates generally to visual presentations and more particularly to rendering virtual objects within a real-world environment captured in a camera feed of a computing device.

BACKGROUND

Augmented reality (AR) refers to supplementing the view of real-world objects and environments with computer-generated graphics content. Virtual rendering systems can be used to create, view, and interact with engaging and entertaining AR experiences, in which 3D virtual object graphics content appears to be present in the real world. Virtual rendering systems are frequently implemented within mobile devices such as smartphones and tablets.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
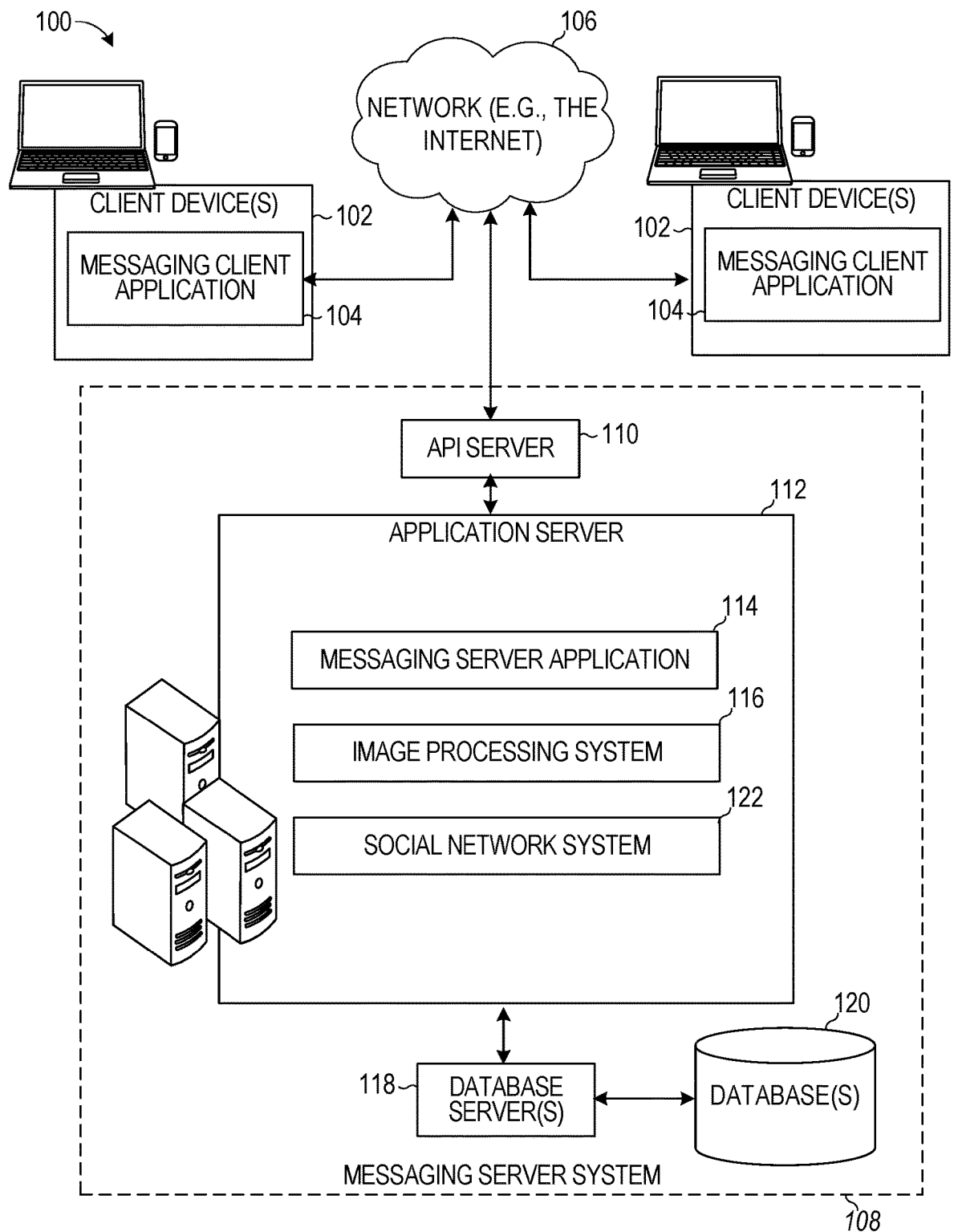
FIG. 1 is a block diagram showing a messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Traditional virtual rendering systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real world. For example, a virtual rendering system may not present virtual objects in a consistent manner with respect to real-world items as a user moves about through the real world.

Additionally, conventional virtual rendering systems are often lacking in functionality related to authoring AR content because these conventional systems are not optimized for the limited display size of mobile computing devices. As an example, conventional virtual rendering systems are often limited to predefined 3D virtual objects and do not provide users with the ability to create or edit these virtual objects. As another example, user interfaces of conventional virtual rendering systems often require users to navigate between various views or windows to access certain content-authoring functions. These systems usually provide buttons or other interactive elements to facilitate navigation between views and windows, but the buttons and other interactive elements often utilize much of the available display space, which may obscure AR content being authored or require a user to navigate to yet another window or view to inspect the AR content being authored. As a result, the AR content authoring process provided by conventional virtual rendering systems may be a time-consuming and tedious process that requires users to repeatedly shuffle through various views and windows to ultimately produce content that may not meet the user's expectations.

Aspects of the present disclosure include systems, methods, techniques, instruction sequences, and computing machine program products for creating image modification effects, such as virtual three-dimensional (3D) objects including a 3D caption and 3D drawings and rendering the image modification effects including virtual 3D objects within a camera feed, as if they exist in real-world environments. For example, the disclosed techniques include operations for receiving, by a messaging application, an image, such as a frame of a video feed, from a camera of a user device; receiving input that selects a user-customizable effects option for activating a user-customizable effects mode; in response to receiving the input, displaying an array of a plurality of effect options together with the image proximate to the user-customizable effects option; and applying a first effect associated with a first effect option of the plurality of effect options to the image. As referred to herein, each effect modifies a pixilation pattern and/or color scheme of the underlying image or video in a different manner.

In these ways, these user interfaces improve upon interfaces of prior systems and improve the operation of a device by providing greater functionality and enhanced mechanisms for interaction such as by providing a user customizable image modification effects that are presented on a real-time video feed depicting real-world environments. Given these improvements, the system may be particularly suitable in mobile device implementations in which a display screen size is limited.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
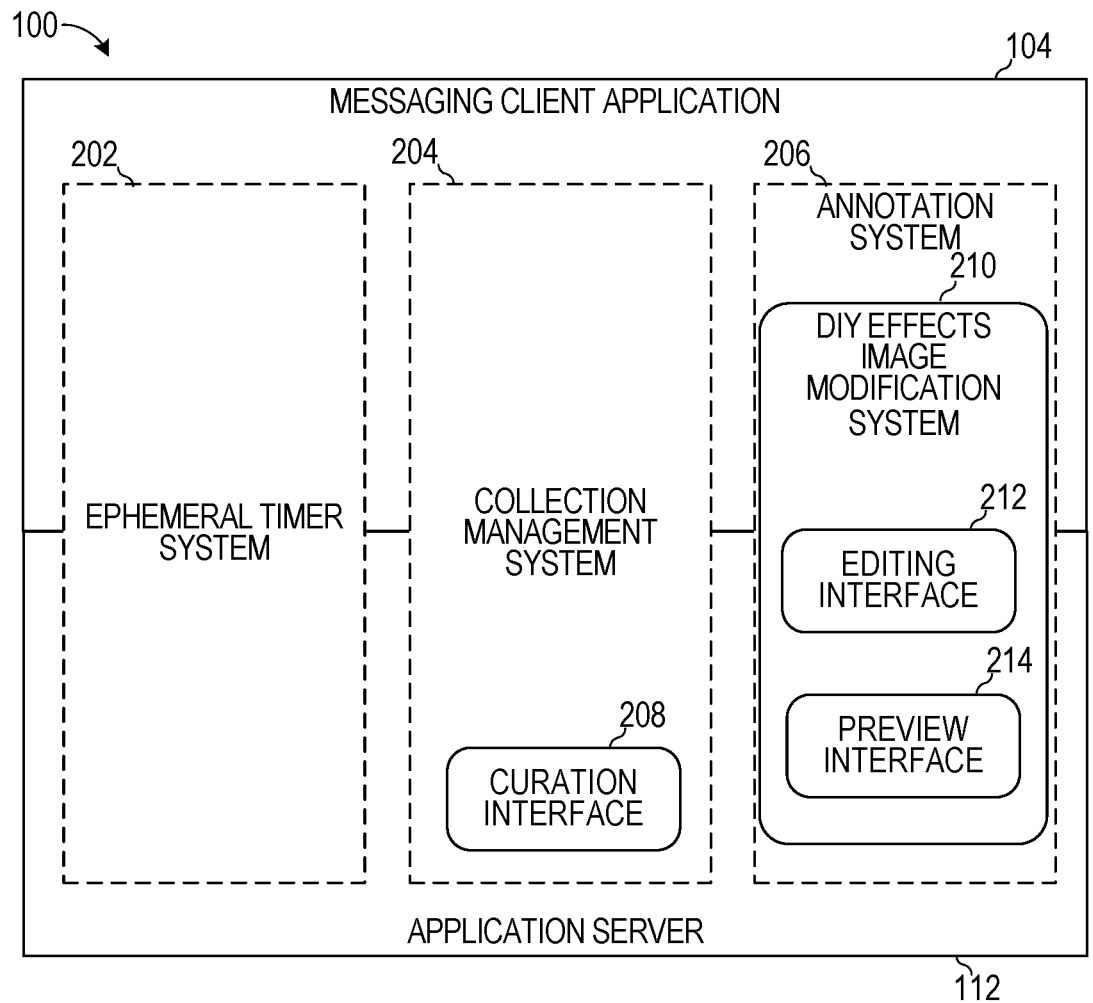
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter or LENS) to the messaging client application 104. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. Specific visual effects according to the disclosed embodiments are depicted in FIGS. 14-18 can be applied by selecting from a variety of options including a sunburn effect option, an old fashion effect option, a frost effect option, a neon effect option, a square effect option, a postcard effect option, an antenna effect option, a moire effect option, a CCTV effect option, a circle effect option, a heart effect option, a rectangle effect option, a bokeh effect option, a flare effect option, and/or a love effect option.

The audio and visual content or the visual effects can be applied to a media content item (e.g., a photo) at the client device 102. For example, the media overlay including text that can be overlaid on top of an image or video generated by the client device 102. In another example, the media overlay includes an identification of a location overlay (e.g., Venice beach), a name of a live event, or a name of a merchant overlay (e.g., Beach Coffee House).

The annotation system 206 includes a DIY effects image modification system 210 that provides functionality to generate, display, and track virtual objects at positions relative to the client device 102, within a 3D space captured within a camera feed of the client device 102 (also referred to by those of ordinary skill in the art as a "camera stream," "a video stream," or a "video feed"). The virtual objects generated, displayed, and tracked by the DIY effects image modification system 210 include 3D captions, 3D cutouts and 3D painting. A 3D caption is a 3D representation of one or more text characters (e.g., letters, symbols, and emojis). The DIY effects image modification system 210 also provides a user-friendly and intuitive display for selecting various image effects to apply and modifying attributes of those effects while a given video feed (or video stream) is being presented to the user. As each effect is selected by the user, the DIY effects image modification system 210 displays an indication of the currently activated and modifies the video stream according to the effect. The DIY effects image modification system 210 also allows a user to vary the attributes of a given effect that is being applied to the video feed.

The DIY effects image modification system 210 provides functionality to enable users to author, edit, and preview image modification effects and 3D objects, such as 3D captions. To this end, the DIY effects image modification system 210 includes an editing interface 212 and a preview interface 214. The editing interface 212 allows a user to author and edit a video feed according to a selected image modification effect. The preview interface 214 allows a user to preview and review the edited video feed before generating a message that includes the edited video feed with the selected effect. The preview interface 214 may also enable the user to edit the presentation of 3D objects (e.g., by changing a scale, orientation, placement, font, style, and/or color of the 3D caption).

In some cases, the DIY effects image modification system 210 may cause a 3D caption to be displayed (e.g., on a display of the client device 102) at position in a 3D space captured within the camera feed based on a reference surface (e.g., the ground) detected in the 3D space. As will be discussed in further detail below, the DIY effects image modification system 210 comprises a redundant tracking system comprising a set of tracking subsystems configured to track a 3D caption at a position in 3D space based on a set of tracking indicia, and transition between tracking subsystems. The DIY effects image modification system 210 may further transition between tracking with six degrees of freedom (6DoF) and tracking with three degrees of freedom (3DoF) based on an availability of the tracking indicia.

In some embodiments, the DIY effects image modification system 210 includes a face detection and/or tracking component. The DIY effects image modification system 210 may receive an indication from the face detection component that a face is detected in a camera feed being received and displayed. In such cases, the DIY effects image modification system 210 automatically positions the 3D caption in close proximity to the face. For example, the DIY effects image modification system 210 may curve the 3D caption around the top of the face (e.g., in the shape of a crown), the bottom of the face or on the forehead of the person depicted in the camera feed. As the user moves the camera around, the face may no longer be detected by the face detection component. As a result, the DIY effects image modification system 210 may move the 3D caption from being placed in proximity to the face to being placed on a suitable reference surface (e.g., the ground). When the camera pans back to reveal the face again, the DIY effects image modification system 210 automatically moves and transitions display of the 3D caption from the reference surface to being in close proximity to the face. When the 3D caption is positioned in proximity to the face in the camera feed, the DIY effects image modification system 210 activates the face tracking component to continuously adjust the position of the 3D caption relative to changes in positions of the face. For example, as the face moves up and down, the 3D caption also moves up and down to keep its placement on top of or underneath the face in the camera feed.

In some embodiments, the DIY effects image modification system 210 enhances and augments the 3D caption with one or more graphical elements (e.g., emojis or avatars) when a face is detected in the camera feed. For example, when the face is detected in the camera, the DIY effects image modification system places a 3D caption (with automatically populated text based on context or manually supplied text from the user) in close proximity to the face. The DIY effects image modification system 210 also searches for one or more graphical elements based on context of the text in the 3D caption. Specifically, the DIY effects image modification system 210 may automatically identify one or more words in the 3D caption that are associated in a database with one or more graphical elements. For example, the DIY effects image modification system 210 may determine that the 3D caption includes the word "love" and may retrieve a heart emoji that is associated with the word "love". The DIY effects image modification system 210 may place the retrieved graphical elements on a left and a right side of the 3D caption to enclose the 3D caption with the graphical elements. For example, the DIY effects image modification system 210 may display the word love in 3D above the user's face as a crown and place two heart emojis (one on the left and one on the right) around the 3D caption. In some cases, the DIY effects image modification system 210 may determine that none of the words or phrases in the 3D caption matches or corresponds to words or phrases previously associated with graphical elements. In such cases, the DIY effects image modification system 210 selects a default graphical element to populate into and add to the 3D caption.

Figure 3:
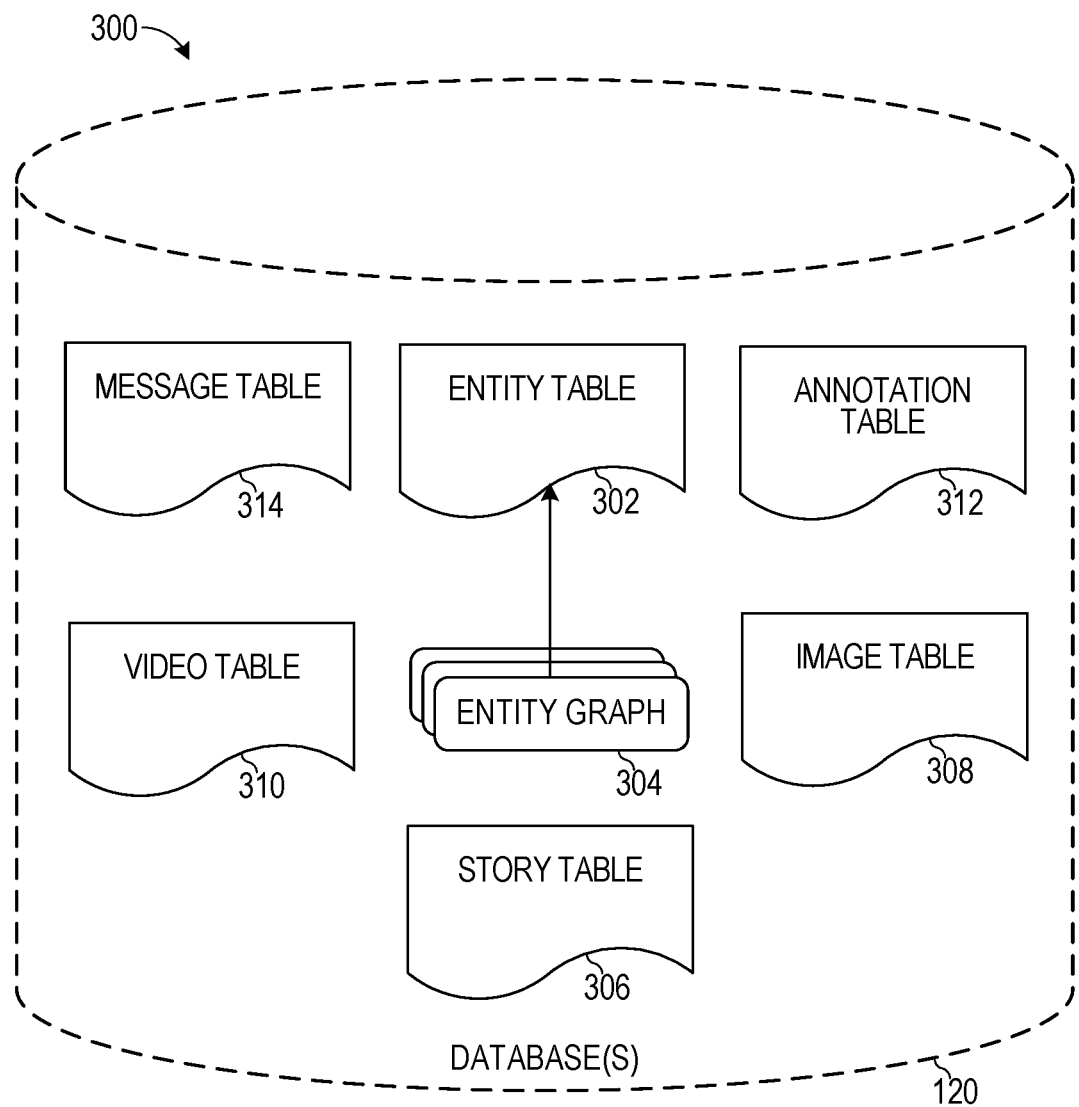
FIG. 3 is a schematic diagram illustrating data which may be stored in the database of the messaging system, according to example embodiments.

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters and LENSES, in an annotation table 312. Filters and LENSES for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. LENSES include real-time visual effects and/or sounds that may be added to real-world environments depicted in a camera feed (e.g., while a user is viewing the camera feed via one or more interfaces of the messaging system 100, while composing a message, or during presentation to a recipient user). In comparison, filters are applied to an image or video after the image or video is captured at the client device 102 while a LENS is applied to the camera feed of the client device 102 such that when an image or video is captured at the client device 102 with a LENS applied, the applied LENS is incorporated as part of the image or video that is generated. Filters and LENSES may be of various types, including user-selected filters and LENSES from a gallery of filters or a gallery of LENSES presented to a sending user by the messaging client application 104 when the sending user is composing a message.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
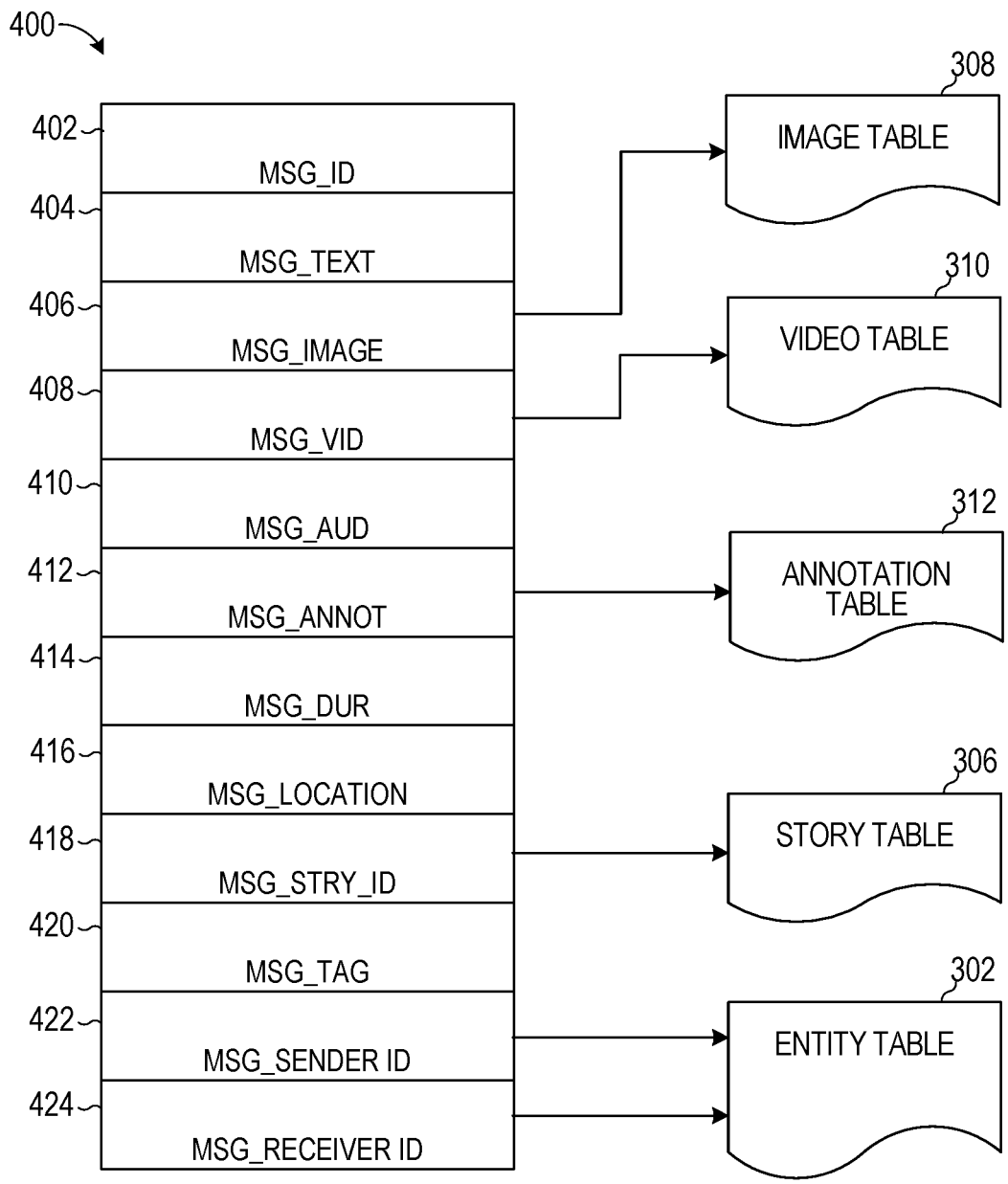
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).

A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
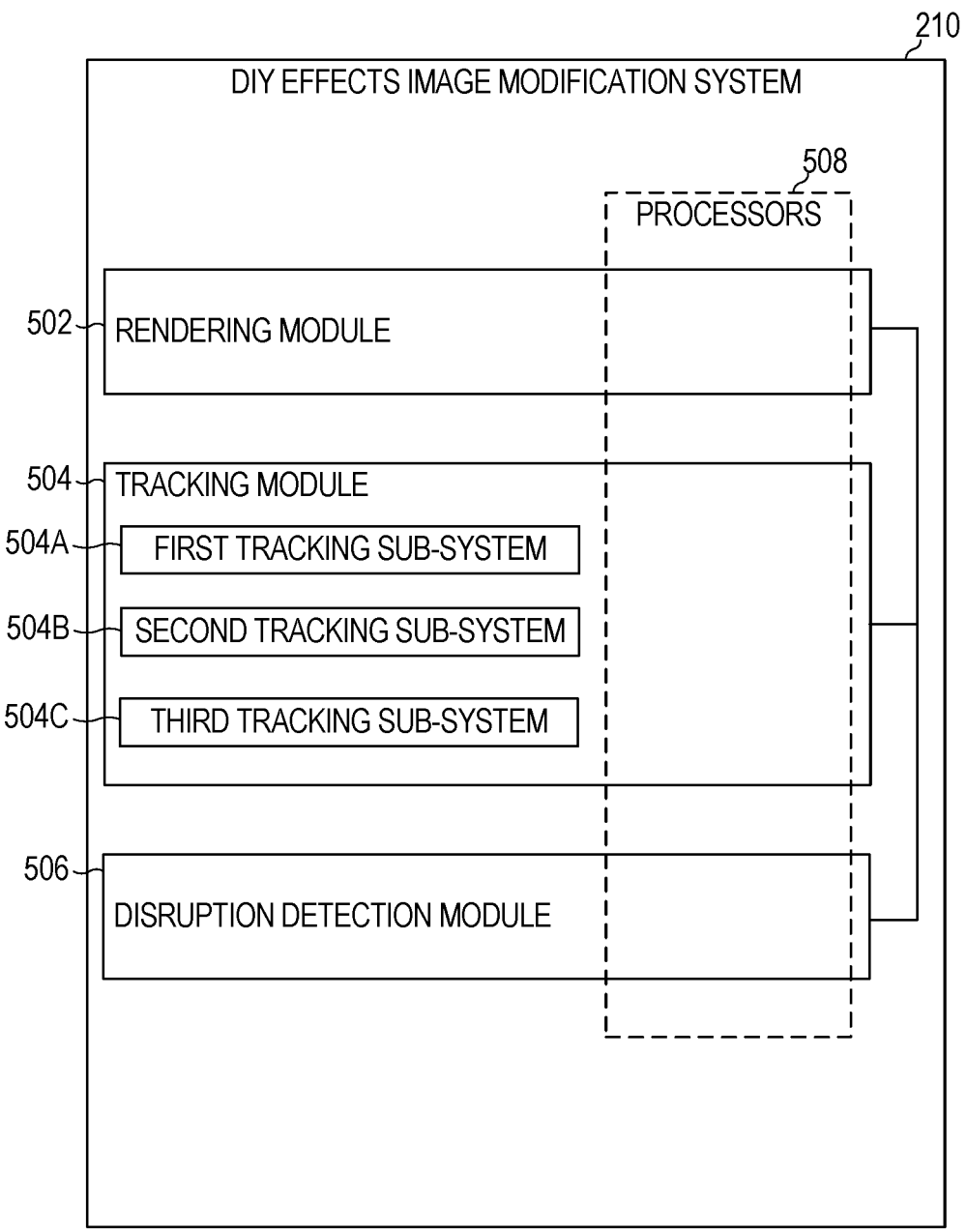
FIG. 5 is a block diagram illustrating various components of a DIY effects image modification system, which may be provided as part of the messaging system, according to example embodiments.

FIG. 5 is a block diagram illustrating functional components of the DIY effects image modification system 210 that configure the DIY effects image modification system 210 to modify effects applied to a video feed and/or to render 3D objects in a 3D space (e.g., a real-world environment) depicted in a live camera feed. The DIY effects image modification system 210 is shown as including a rendering component 502, a tracking system 504, and a disruption detection component 506. The various components of the DIY effects image modification system 210 may be configured to communicate with each other (e.g., via a bus, shared memory, or a switch). Although not illustrated in FIG. 5, in some embodiments, the DIY effects image modification system 210 may include or may be in communication with a front-facing or rear-facing camera configured to produce a camera feed comprising image data that includes a sequence of images (e.g., a video).

Any one or more of the components described may be implemented using hardware alone (e.g., one or more of the processors 508 of a machine) or a combination of hardware and software. For example, any component described of the DIY effects image modification system 210 may physically include an arrangement of one or more of the processors 508 (e.g., a subset of or among the one or more processors of the machine) configured to perform the operations described herein for that component. As another example, any component of the DIY effects image modification system 210 may include software, hardware, or both, that configure an arrangement of one or more processors 508 (e.g., among the one or more processors of the machine) to perform the operations described herein for that component. Accordingly, different components of the DIY effects image modification system 210 may include and configure different arrangements of such processors 508 or a single arrangement of such processors 508 at different points in time.

Moreover, any two or more components of the DIY effects image modification system 210 may be combined into a single component, and the functions described herein for a single component may be subdivided among multiple components. Furthermore, according to various example embodiments, components described herein as being implemented within a single machine, database, or device may be distributed across multiple machines, databases, or devices.

The tracking system 504 may comprise a first tracking sub-system 504A, a second tracking sub-system 504B, and a third tracking sub-system 504C. Each tracking sub-system tracks the position of a 3D caption within the 3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization And Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with 3DoF. Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the DIY effects image modification system 210 comprises multiple redundant tracking sub-systems 504A-C that enable seamless transitions between tracking sub-systems. The multiple redundant tracking sub-systems 504A-C address the issues with traditional tracking systems by merging multiple tracking approaches into a single tracking system 504. The tracking system 504 is able to combine 6DoF and 3DoF tracking techniques through combining and transitioning between multiple tracking systems based on the availability of tracking indicia tracked by the tracking systems. Thus, as the indicia tracked by any one tracking system becomes unavailable, the DIY effects image modification system 210 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the DIY effects image modification system 210 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1$-$T_0$ as the translation of the view matrix.

The rendering component 502 of the DIY effects image modification system 210 is configured to generate user customizable effects to apply to a live camera feed produced by a camera. The rendering component 502 is configured to present a set of effect selection options in an array together with the camera feed and to present an effect attribute modification slider to enable a user to modify attributes of an effect that is currently applied to the camera feed.

The rendering component 502 of the DIY effects image modification system 210 is also configured to generate and render 3D captions in a 3D space captured within a live camera feed produced by a camera. For example, the rendering component 502 may generate a 3D caption based on input received from a user (e.g., keyboard input) and render the 3D caption in the 3D space captured within the live camera feed. In rendering the 3D caption, the DIY effects image modification system 210 assigns the 3D caption to a position in the 3D space based on a real-world reference surface detected in the 3D space. In some cases, the rendering component 502 automatically positions the 3D caption in 3D space on top of a user's head or under the user's head in response to detecting presence of a face in the camera feed. The rendering component 502 automatically transitions the 3D caption to a reference surface (e.g., the ground) from being presented on top of or under the user's head when the face is no longer presented in the camera feed (e.g., because the user panned the camera right/left/up/down to a point where the face is no longer being picked up by the camera). Similarly, the rendering component 502 automatically transitions the 3D caption to being presented on top of or under the user's head from being presented on a reference surface (e.g., the ground) when the face is again (or for the first time) presented in the camera feed (e.g., because the user panned the camera right/left/up/down to a point where the face is being picked up by the camera).

The DIY effects image modification system 210 may thereafter track the position of the 3D caption relative to a user device in the 3D space by one or more tracking systems in 6DoF. For example, the one or more tracking systems of the DIY effects image modification system 210 may collect and analyze a set of tracking indicia (e.g., roll, pitch, yaw, natural features, etc.) in order to track the position of the 3D caption relative to the user device in the 3D space with 6DoF. In such embodiments, the DIY effects image modification system 210 may transition between tracking systems based on the availability of the tracked indicia to maintain consistent tracking in 6DoF.

The disruption detection component 506 monitors tracking indicia to detect disruptions. Upon the disruption detection component 506 detecting an interruption of one or more indicia, such that tracking in 6DoF becomes unreliable or impossible, the DIY effects image modification system 210 transitions to tracking the 3D caption in the 3D space in 3DoF in order to prevent an interruption of the display. For example, the DIY effects image modification system 210 may transition from a first tracking system (or first set of tracking systems among the set of tracking systems) to a second tracking system among the set of tracking systems (or second set of tracking systems), wherein the second tracking system is capable of tracking the 3D caption with 3DoF in the 3D space, based on the tracking indicia available.

In some example embodiments, the set of tracking systems of the DIY effects image modification system 210 includes a gyroscopic tracking system, an NFT system, as well as a SLAM tracking system. Each tracking system among the set of tracking systems may analyze tracking indicia in order to track a position of a virtual object within a 3D space. For example, to track a virtual object with 6DoF, the DIY effects image modification system 210 may require at least six tracking indicia to be available. As tracking indicia become obstructed or unavailable for various reasons, the DIY effects image modification system 210 may transition between the available tracking systems among the set of tracking systems in order to maintain 6DoF, or transition to 3DoF if necessary.

It will be readily appreciated that the DIY effects image modification system 210 provides consistent rendered virtual objects (e.g., 3D captions, 3D cutouts, and/or 3D drawings or paintings) in real-world 3D spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

Figure 6:
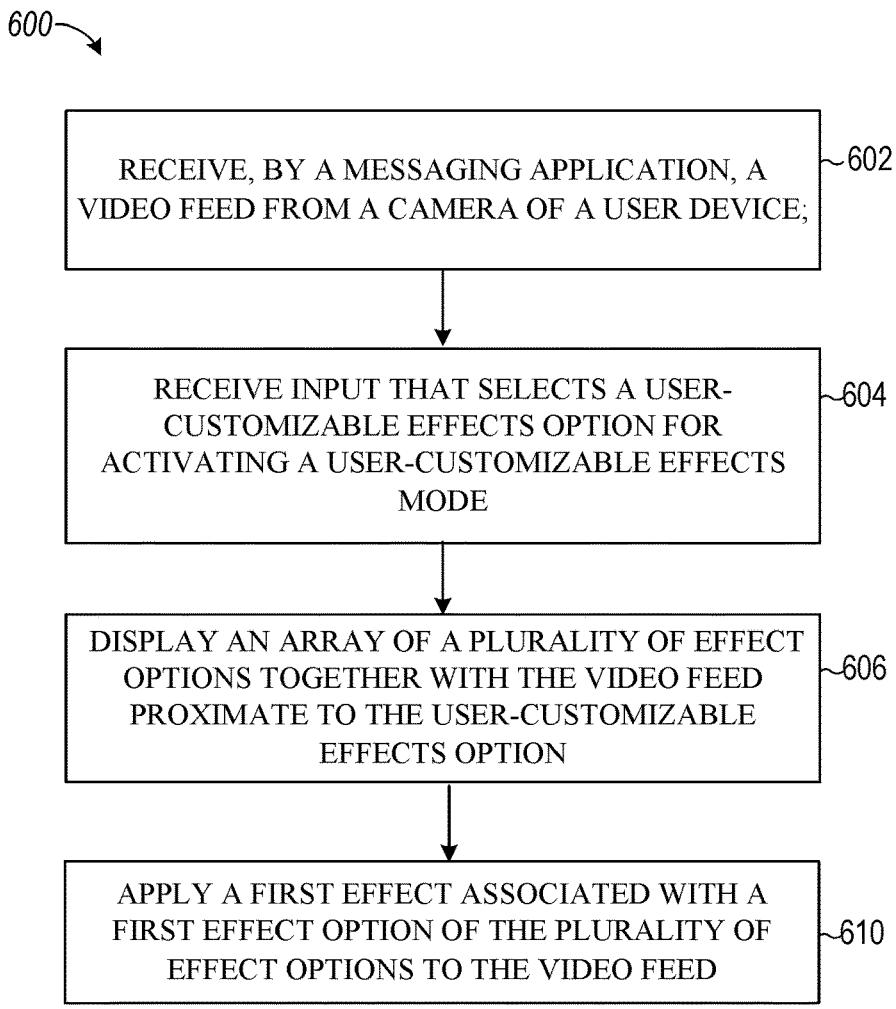
FIGS. 6 and 7 are flowcharts illustrating example operations of the DIY effects image modification system in performing a method for generating a message that includes a 3D caption, according to example embodiments.
Figure 7:
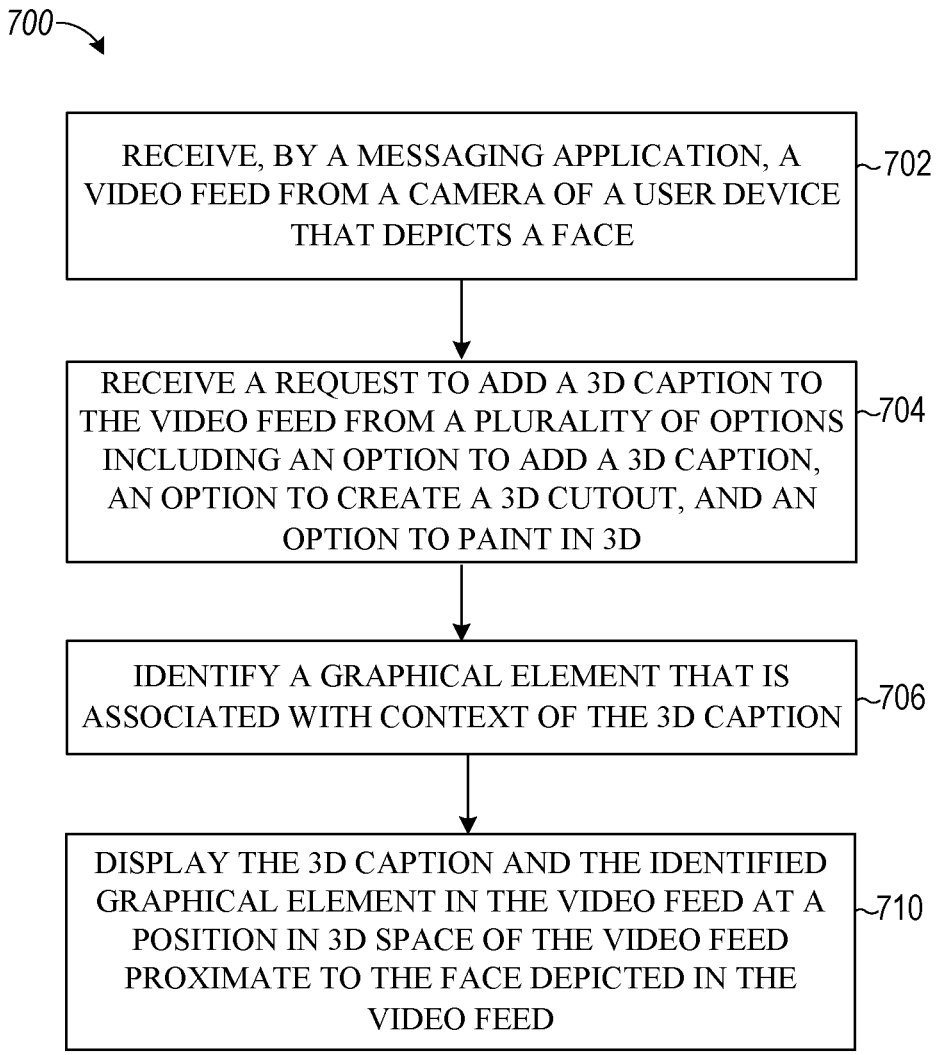

FIGS. 6-7 are flowcharts illustrating example operations of the DIY effects image modification system in performing methods 600 and 700 for generating a message that includes an video feed enhanced with user customizable effects and/or a 3D caption, according to example embodiments. The methods 600 and 700 may be embodied in computer-readable instructions for execution by one or more processors such that the operations of the methods 600 and 700 may be performed in part or in whole by the functional components of the DIY effects image modification system 210; accordingly, the methods 600 and 700 are described below by way of example with reference thereto. However, it shall be appreciated that at least some of the operations of the methods 600 and 700 may be deployed on various other hardware configurations and the methods 600 and 700 are not intended to be limited to the DIY effects image modification system 210.

Figure 14A:
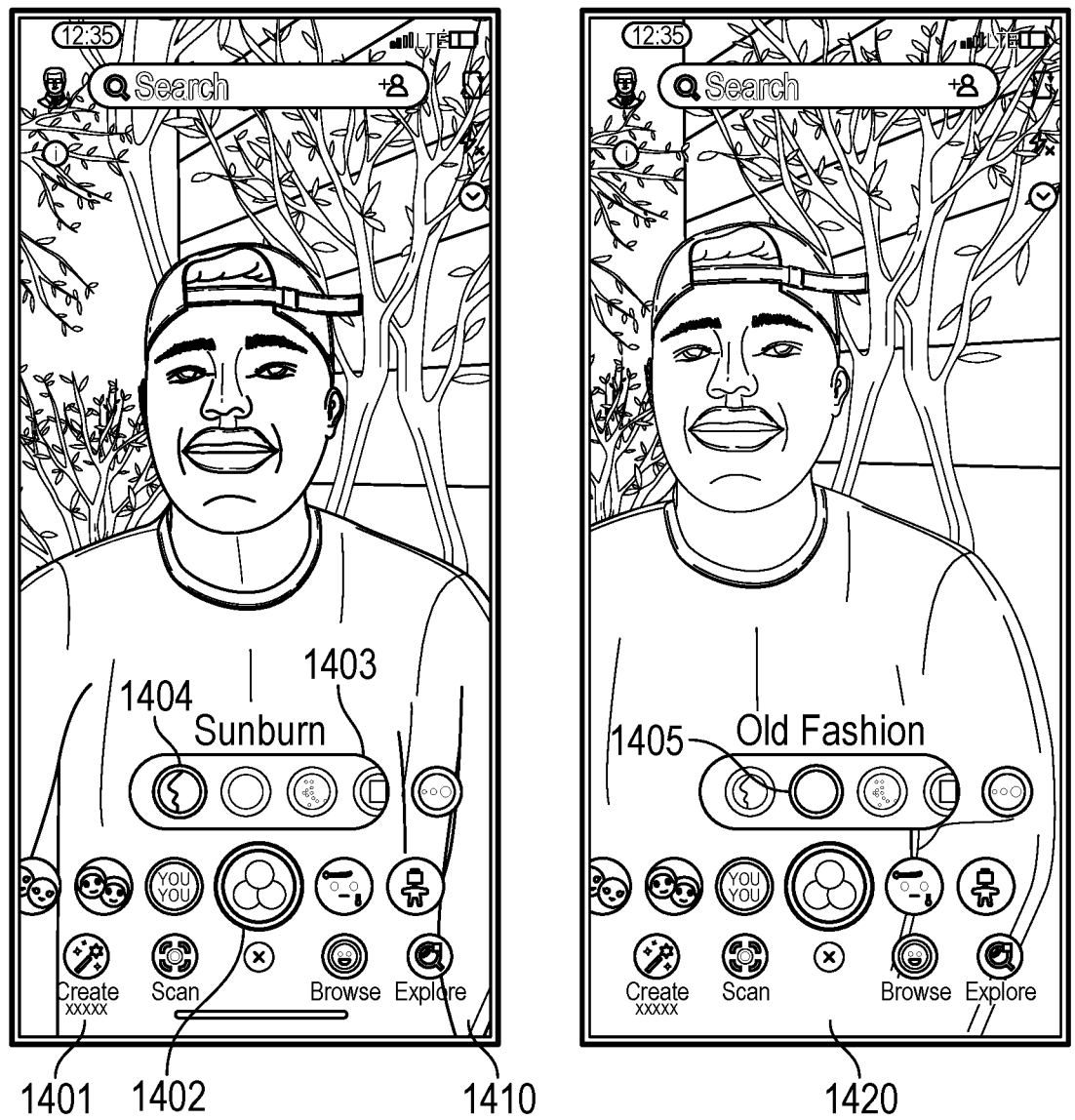

At operation 602, the DIY effects image modification system 210 receives a video feed from a camera of a user device. For example, the DIY effects image modification system 210 receives and displays a camera feed received from a rear-facing camera of the client device 102. In another example, the DIY effects image modification system 210 receives an image, such as a frame of a real-time video feed and/or a previously captured picture or frame of a video feed. Specifically, as shown in FIG. 14A, an image 1410 (e.g., a frame of a video feed) is received and presented to the user.

At operation 604, the DIY effects image modification system 210 receives input that selects a user-customizable effects option for activating a user-customizable effects mode. For example, the DIY effects image modification system 210 receives a user selection of a create option 1401. In response to receiving the user selection of the create option 1401, a list of image modification elements are presented from which the user selects a user-customizable effects option (FIG. 14A).

At operation 606, the DIY effects image modification system 210 displays an array of a plurality of effect options together with the video feed proximate to the user-customizable effects option. For example, in response to the DIY effects image modification system 210 receiving the user selection of the user-customizable effects option 1402, the DIY effects image modification system 210 displays an array 1403 that includes a plurality of effect options on top of the underlying image 1410.

At operation 610, the DIY effects image modification system 210 applies a first effect associated with a first effect option of the plurality of effect options to the video feed. For example, the DIY effects image modification system 210 automatically selects and applies a first effect (e.g., the Sunburn effect) associated with a first effect option 1404 that is positioned first in the array 1403. The underlying image 1410 is modified according to the pixilation pattern and/or color scheme associated with the first effect. In some cases, a user input is received to select a second effect option from the array 1403. For example, the user can navigate left/right by swiping or sliding the user's finger across the region in which the array 1403 is displayed. The user can then tap or press and hold a particular effect option 1405 (e.g., the Old Fashion effect) which causes the DIY effects image modification system 210 to replace the currently applied effect (e.g., the Sunburn effect) with the newly selected effect (e.g., Old Fashion effect). The resulting image 1420 is presented to the user by the DIY effects image modification system 210 (FIG. 14A). A visual indicator (e.g., a highlight ring) is displayed on the currently active effect. Specifically, the DIY effects image modification system 210 now moves the visual indicator from highlighting the first option corresponding to the Sunburn effect to highlighting the second option corresponding to the selected Old Fashion effect.

Figure 14B:
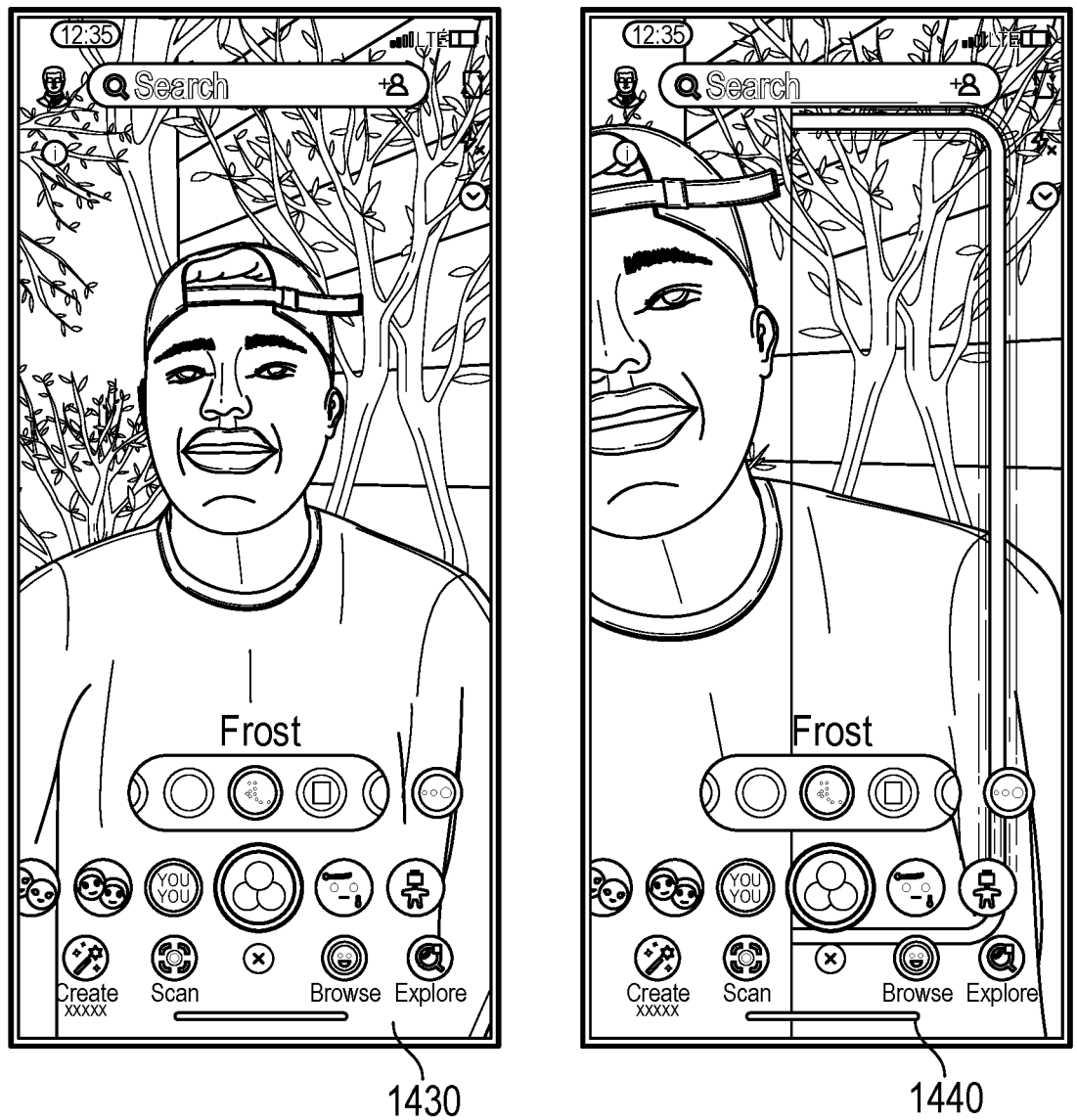

In some embodiments, the user can navigate between different ones of the effect options of the array 1403 by swiping across the image on the screen. Specifically, if the DIY effects image modification system 210 receives an indication that the user swiped across a portion of the screen in which the image (or modified image) is presented in the left direction, the DIY effects image modification system 210 retrieves the next adjacent effect that is on the right or left of the currently applied effect and automatically applies the next adjacent effect. For example, as shown in FIG. 14B, a third effect option corresponding to the Frost effect is currently being applied to the image 1430. The DIY effects image modification system 210 receives input from the user that swipes across the screen in the left direction. In response, the DIY effects image modification system 210 identifies the next adjacent effect option that is immediately positioned to the right of the third effect option. In this case, the DIY effects image modification system 210 determines that the next adjacent effect corresponds to the neon square effect. As a result, the DIY effects image modification system 210 applies the neon square effect or the effect corresponding to the next adjacent effect to portions of the image 1440 as the portions are being swiped in. In particular, the DIY effects image modification system 210 continuously modifies additional portions of the image that is displayed according to the next adjacent effect as the additional portions are retrieved and swiped into the video. As a result, a first portion of the screen presents a first portion of the image with the third effect being applied and a second portion of the screen presents a second portion of the image with the next adjacent effect being applied. When the complete image with the next adjacent effect is swiped in and the display presents the image with the next adjacent effect completely applied, the DIY effects image modification system 210 updates the array 1403 to indicate that the next adjacent effect is currently being applied.

Figure 15:

FIG. 15 is an interface diagram that illustrates a user interface provided by the messaging system 100, according to some embodiments. Specifically, two more types of effects are shown in which a Square effect is applied to the underlying image (on the left) and the Postcard effect is applied to the underlying image (on the right).

Figure 16:
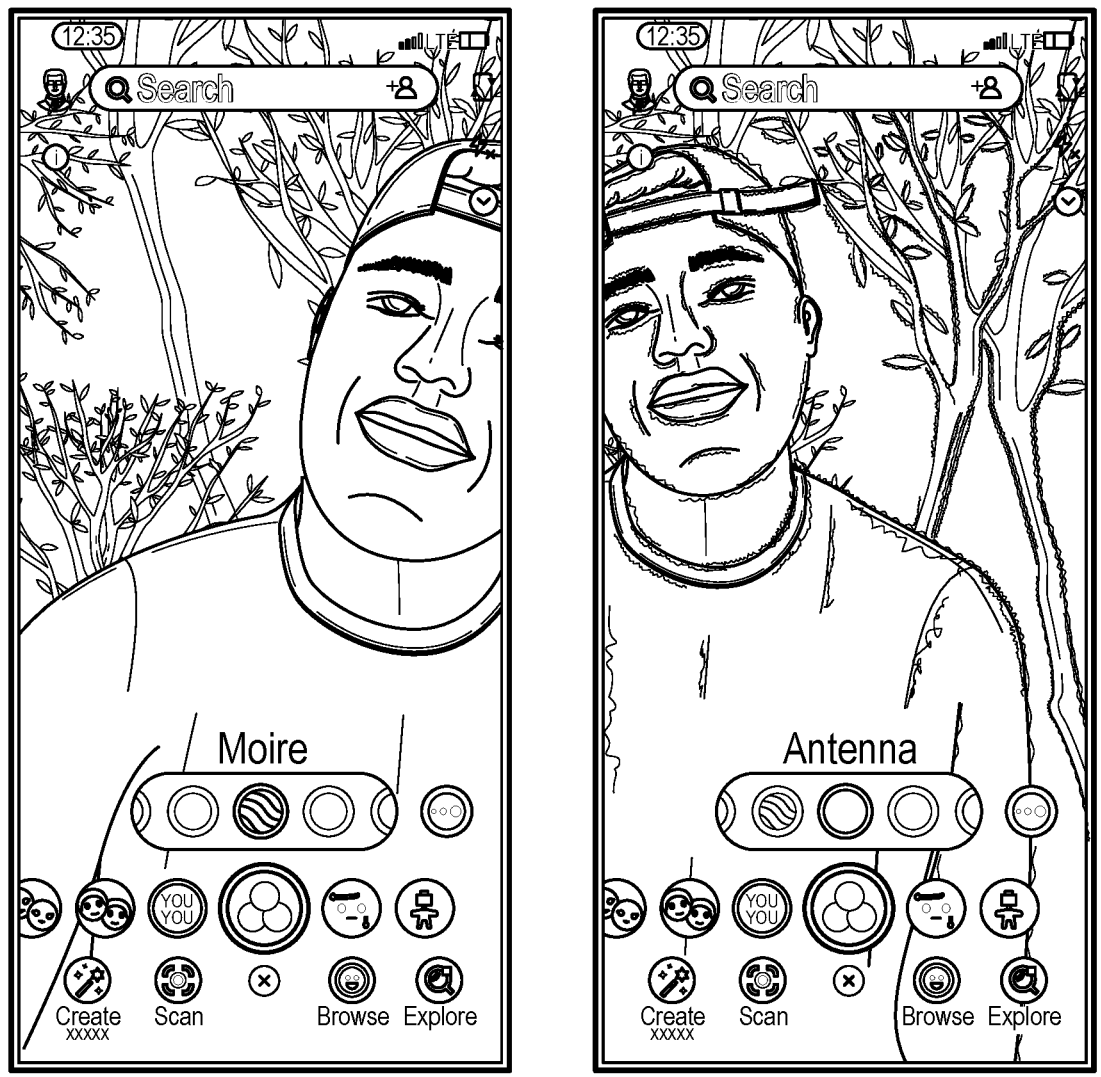

FIG. 16 is an interface diagram that illustrates a user interface provided by the messaging system 100, according to some embodiments. Specifically, two more types of effects are shown in which a Moire effect is applied to the underlying image (on the left) and the Antenna effect is applied to the underlying image (on the right).

Figure 17:
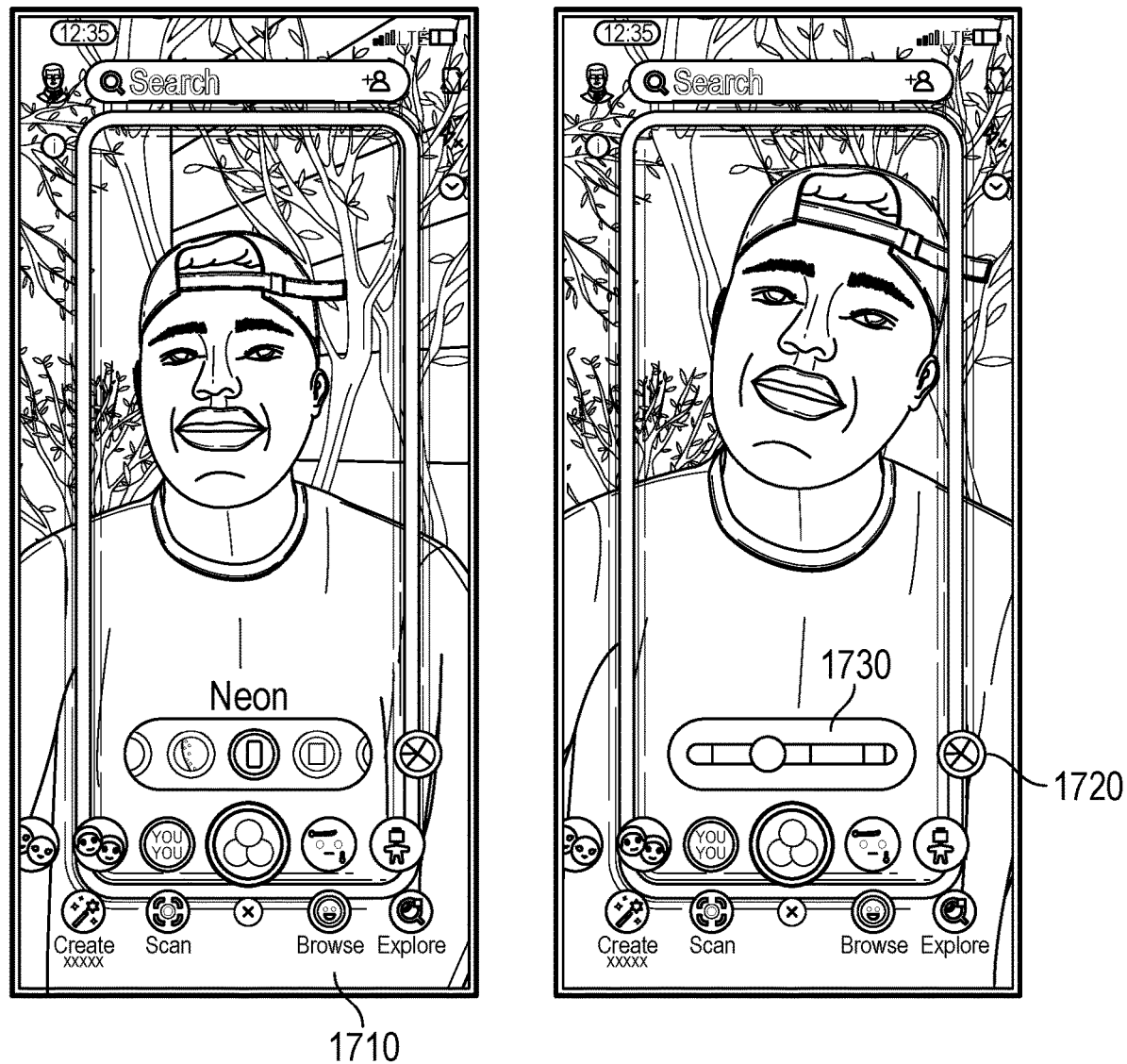

In some embodiments, the DIY effects image modification system 210 presents an effect modification option proximate to the array of effect options over the image or video presented on the screen. For example, as shown in FIG. 17, the DIY effects image modification system 210 presents the image 1710 to which a Neon effect is currently applied. The DIY effects image modification system 210 also presents an effect modification option 1720 on the right of the array of effect options. The visual property of the effect modification option 1720 depends on the types of attributes that the effect modification option allows a user to change for the applied effect. For example, the effect modification option 1720 may allow the user to change the intensity of the underlying effect or may allow the user to change the color of the underlying effect. If the effect modification option 1720 allows the user to change the intensity, the effect modification option 1720 includes a first visual property and if the effect modification option 1720 allows the user to change the color of the effect, the effect modification option includes a second visual property different from the first visual property.

Figure 18:
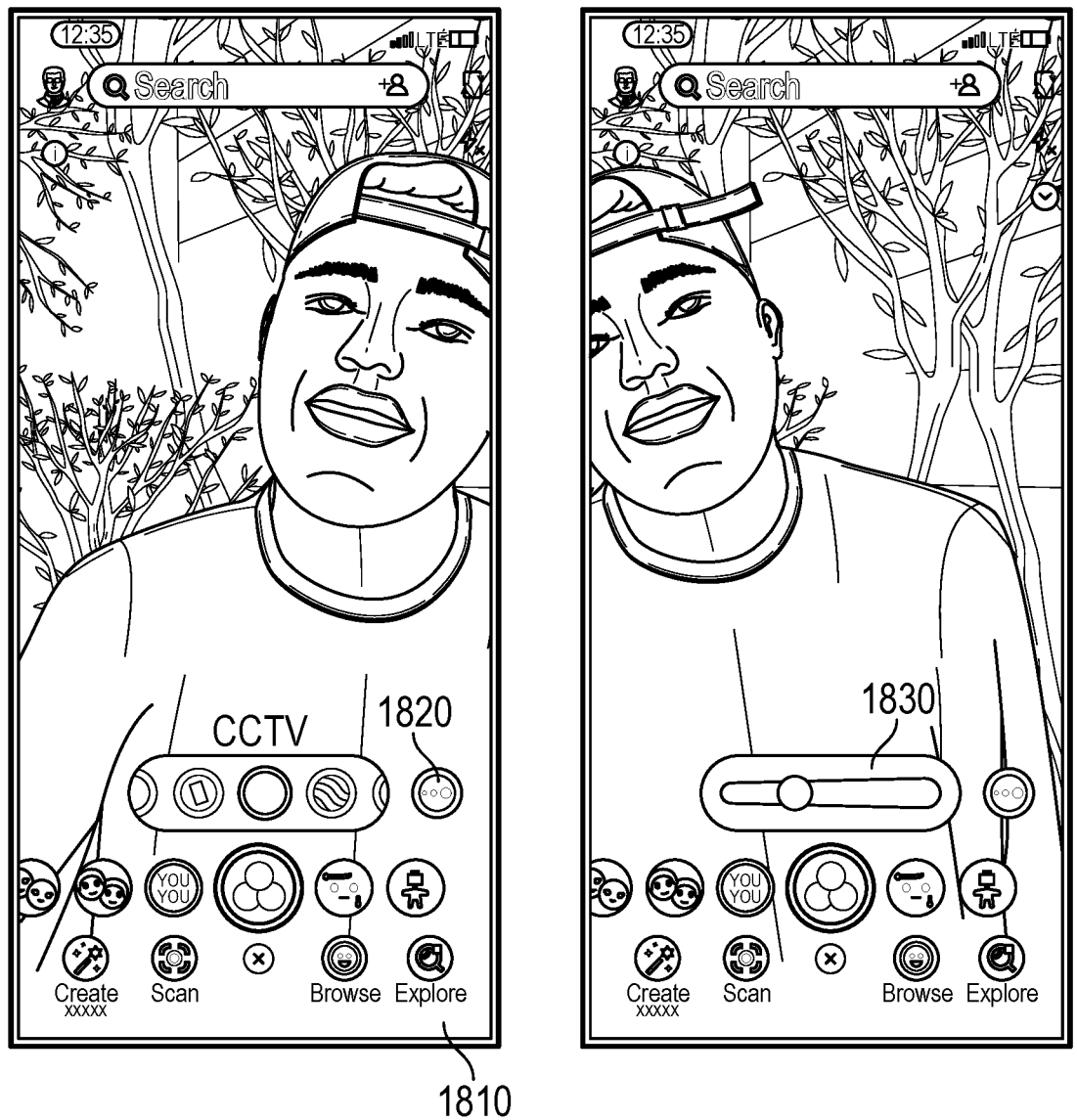

The visual property of the effect modification option 1720 only changes as different effect options are selected and/or applied if the new effect option or effect that is applied is associated with a different attribute modification than the currently applied effect. As an example, the Neon effect that is applied to the image 1710 may be associated with a color attribute modification feature for the effect modification option 1720. As such, the effect modification option 1720 is presented with a first visual property. The user can then select a new effect to apply to the image. The DIY effects image modification system 210 determines if the new effect that is applied is associated with the color attribute modification feature or an intensity modification feature. In response to determining that the new effect is associated with the color attribute modification feature (the same as the attribute modification feature of the previously applied effect), the DIY effects image modification system 210 maintains the first visual property for the effect modification option 1720. In response to determining that the new effect (e.g., a CCTV effect) as shown in FIG. 18 is associated with an intensity modification feature, the DIY effects image modification system 210 changes the visual property of the effect modification option 1720 to be a second visual property 1820.

In response to receiving a user selection of the effect modification option 1720 that corresponds to a color modification feature, the DIY effects image modification system 210 replaces the display of the array of effect options with a slider 1730 for changing the color of the applied effect. The user can slide left/right the slider 1730 or a cursor in the slider 1730 (or press and drag on the slider 1730) to change the color of the effect that is applied to the image 1710. For example, the color of the Neon effect that is applied to the image 1710 can be changed from yellow to blue to red as the user slides the slider 1730 further to the right. The user can also swipe across the screen instead of the slider 1730 to change the color of the effect that is being applied. Similarly, in response to receiving a user selection of the effect modification option 1820 (FIG. 18) that corresponds to an intensity modification feature, the DIY effects image modification system 210 replaces the display of the array of effect options with a slider 1830 for changing the intensity of the applied effect. The user can slide left/right the slider 1830 or a cursor in the slider 1830 to change the intensity of the effect that is applied to the image 1810. The user can also swipe across the screen instead of the slider 1830 to change the intensity of the effect that is being applied.

In to receiving a user selection of the effect modification option 1720 or 1820, the DIY effects image modification system 210 replaces the effect modification option 1720 with a new option to access the array of effect options. In response to receiving a user selection of the new option, the DIY effects image modification system 210 replaces the display of the slider 1730/1830 with the previously presented array of effect options.

Referring back to FIG. 7, at option 702, the DIY effects image modification system 210 receives a video feed from a camera of a user device. For example, the DIY effects image modification system 210 receives and displays a camera feed received from a front-facing camera of the client device 102.

At option 704, the DIY effects image modification system 210 receives a request to add a 3D caption to the video feed from a plurality of options including an option to add a 3D caption, an option to create a 3D cutout, and an option to paint in 3D. For example, the DIY effects image modification system 210 receives a user selection of an option to add a 3D caption. The DIY effects image modification system 210 dims the screen and presents a cursor allowing the user to input one or more characters of a word or phrase in 2D based on which the 3D caption is generated.

At option 706, the DIY effects image modification system 210 identifies a graphical element that is associated with context of the 3D caption. For example, the DIY effects image modification system 210 searches a database of graphical elements to identify a graphical element that is associated with the words or phrases in the 3D caption. In some cases, the DIY effects image modification system 210 searches a database of contexts associated with words or phrases. Then the DIY effects image modification system 210 retrieves a matching context and searches another database that associates different contexts with different graphical elements to identify a graphical element associated with the 3D caption.

At option 710, the DIY effects image modification system 210 displays the 3D caption and the identified graphical element in the video feed at a position in 3D space of the video feed proximate to the face depicted in the video feed. For example, the DIY effects image modification system 210 duplicates the retrieved graphical element (e.g., an emoji) and presents each instance of the duplicated graphical element on a given side of the 3D caption. Namely, a first graphical element may be positioned on a left side of the 3D caption and a second graphical element (that is a duplicate of the first graphical element) may be positioned on a right side of the 3D caption.

Figure 8:
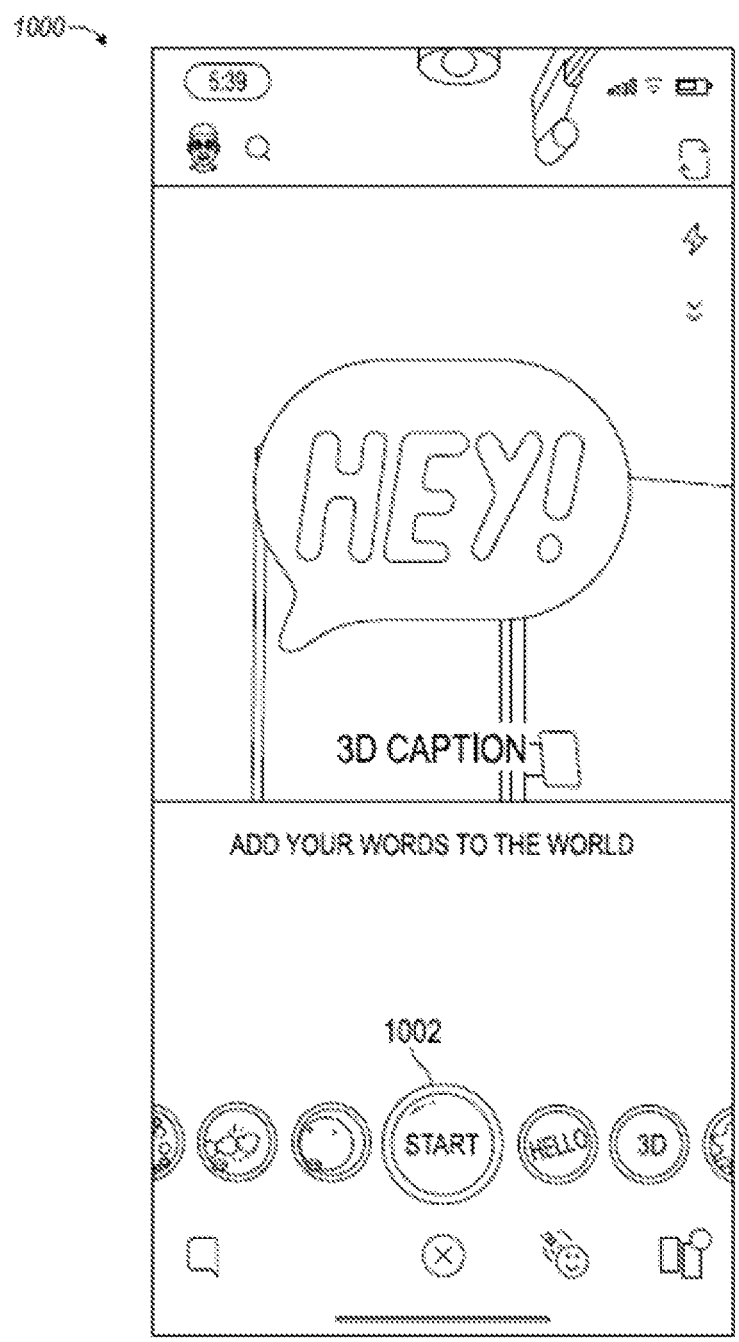
FIGS. 8-18 are interface diagrams that illustrate various interfaces provided by the messaging system, according to some example embodiments.

FIG. 8 is an interface diagram that illustrates a user interface 1000 provided by the messaging system 100, according to some embodiments. User interface 1000 includes a LENS carousel from which a user may initiate functionality of the DIY effects image modification system 210 through selection of icon 1002. As shown, the LENS carousel is overlaid upon a 3D space captured within a camera feed produced by a camera of a computing device (e.g., a client device 102).

Consistent with some embodiments, upon receiving a user selection of the icon 1002, a user is presented with an editing interface configured for creating and editing a 3D caption. For example, upon receiving a user selection of the icon 1102, the DIY effects image modification system 210 may cause display of a user interface 1100 illustrated in FIG. 9.

Figure 9:
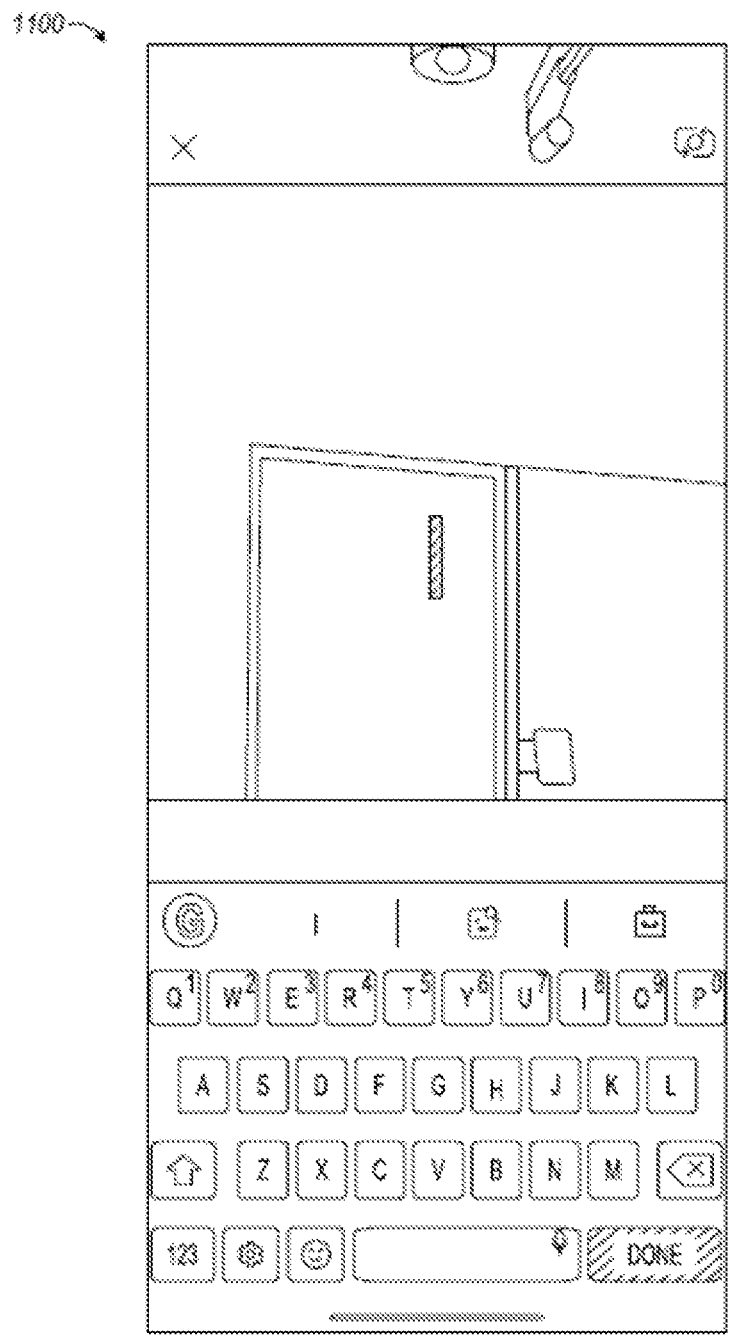

As shown in FIG. 9, the user interface 1100 includes a keyboard and a blinking cursor overlaid upon the 3D space captured within the camera feed. In some cases, upon receiving a user selection of the icon 1002, the keyboard of user interface 1100 is animated up from the bottom of the screen. A style carousel (that includes a menu listing various styles, such as round, spooky, bubble, 8-bit, and so forth) is then animated in after the keyboard is animated up. Together with the keyboard, a color picker that includes various colors is also animated into the screen to allow the user to swipe up/down on the screen using their finger to gradually or quickly change the color of the text input for the 3D caption. The style carousel and color picker are shown and described in FIG. 14A. The user may use the keyboard to input one or more text characters that provide a basis for a 3D caption to be rendered within the 3D space. The user interface 1100 is an example of the editing interface 212. In some cases, the language of the keyboard can be changed using a specified option on the screen.

Figure 10:
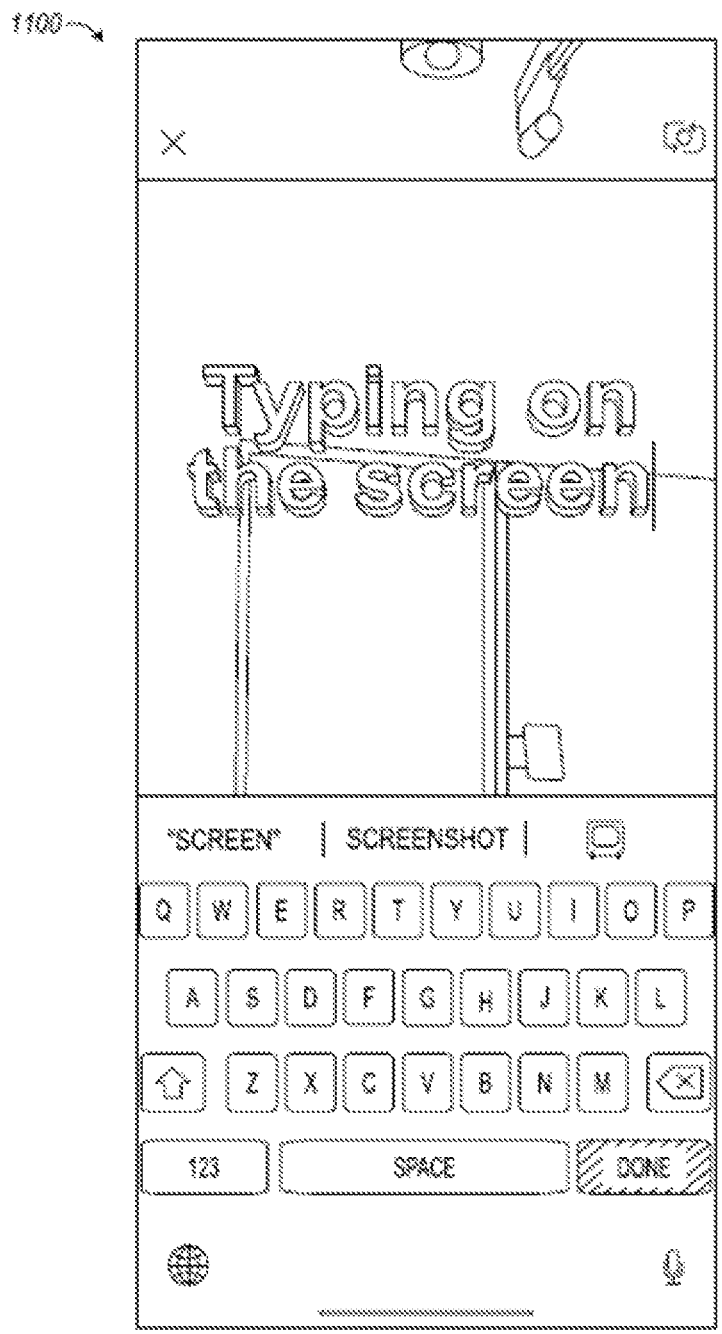

As shown in FIG. 10, upon receiving input from the user (e.g., entered via the keyboard), the user interface 1100 is updated to present a representation of the input text ("Typing on the screen"). Within the user interface 1100, a 2D representation of the user input is rendered at the foreground of the camera feed of the client device 102. In essence, the 2D representation of the user input is a 2D representation of a 3D caption. In other words, the 2D representation of the user input is a preview of the 3D caption. In some cases, the 2D representation screen used to type in the text is presented in a dimmed manner (e.g., with less brightness) than the camera feed presented on the display before the user selected the icon 1002. Namely, in response to receiving the user selection of icon 1002, the DIY effects image modification system 210 dims the display and presents a cursor allowing the user to input a 2D text string.

Consistent with some embodiments, a user of the client device 102 may access a preview interface (e.g., preview interface 214) that includes a preview of the 3D caption by providing an input such as changing an orientation of the client device 102 (e.g., changing the orientation of the camera from pointing upward to pointing downward) or by selecting an interface element (e.g., a button) presented within the preview interface 214.

Figure 11:
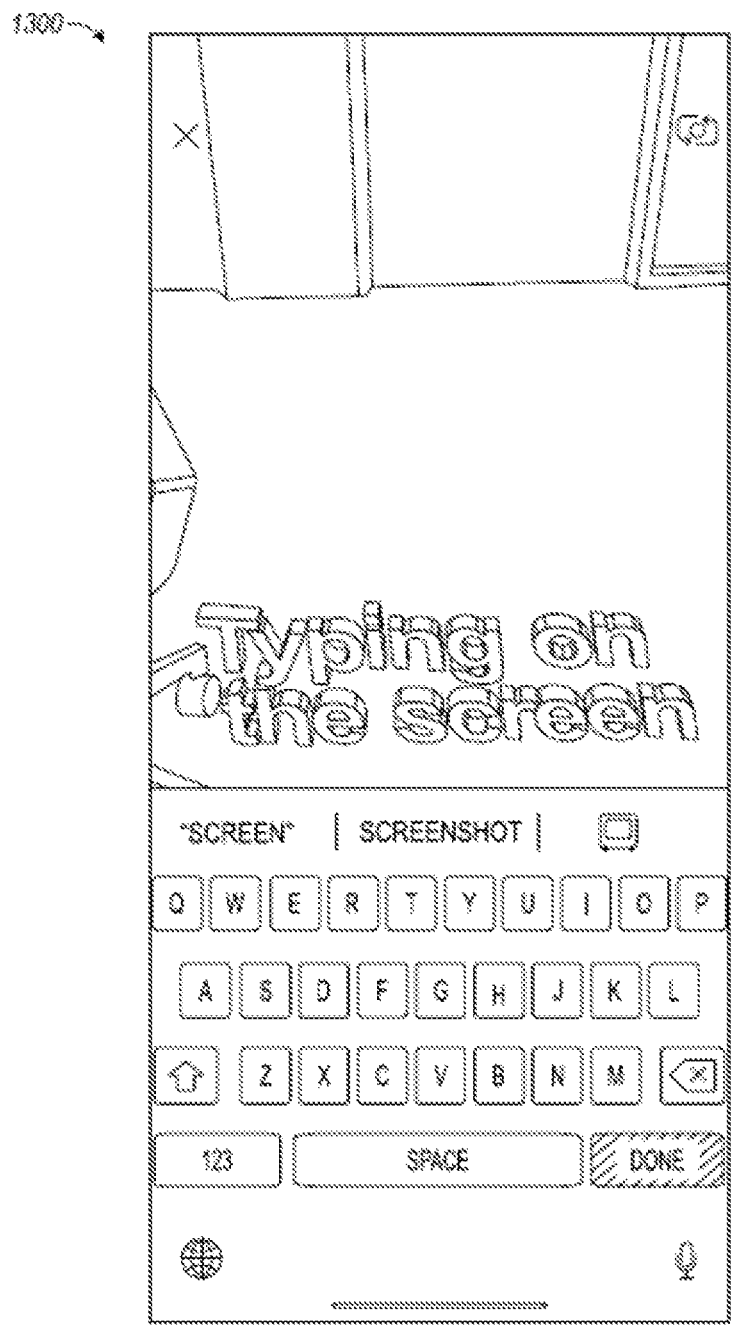

FIG. 11 illustrates an interface 1300 that includes a preview of a 3D caption generated based on user input (e.g., user input provided via the interface 1100). The interface 1300 is an example of the preview interface 214. As noted above, the user may access the interface 1300 by providing an input such as a change in orientation. As shown in FIG. 11, upon detecting a reference surface (e.g., the ground) in the 3D space captured within the camera feed (e.g., based on a change of orientation of the computing device), a 3D caption based on the user's authored text is rendered within the 3D space captured within the camera feed. As shown, the 3D text object is rendered with respect to a reference surface in the 3D space. That is, the 3D text object, as rendered, is oriented within the 3D space at a position relative to the reference surface (e.g., the ground). Rendering the 3D object in this manner makes it appear attached to a real-world surface captured within the camera feed. In an example, if the rear-facing camera is used to capture and display the camera feed, the 3D caption is positioned on a surface, such as the ground, in the camera feed. If the front-facing camera is used to capture and display the camera feed, the 3D caption is added to the face depicted in the camera feed.

Figure 12A:
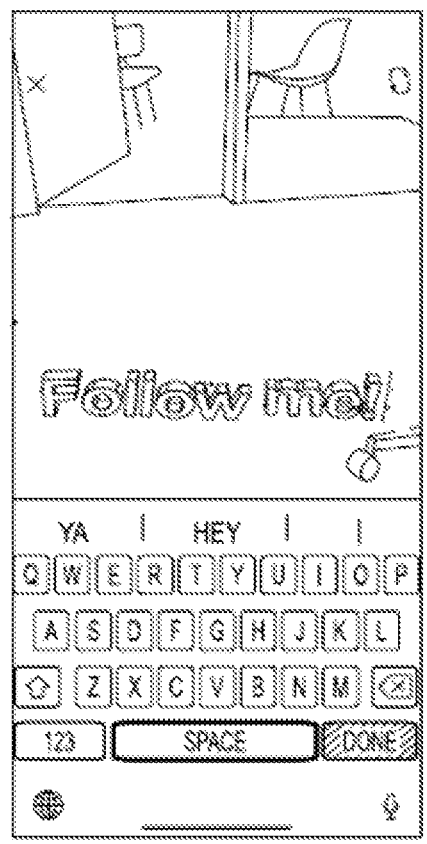
Figure 12B:
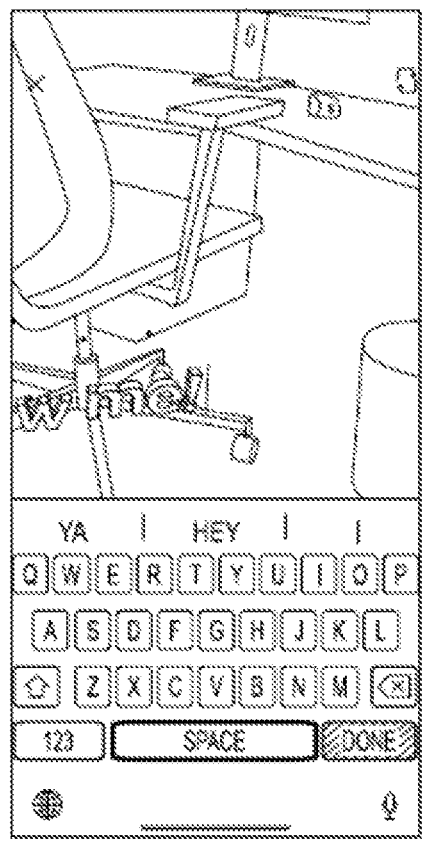
Figure 12C:
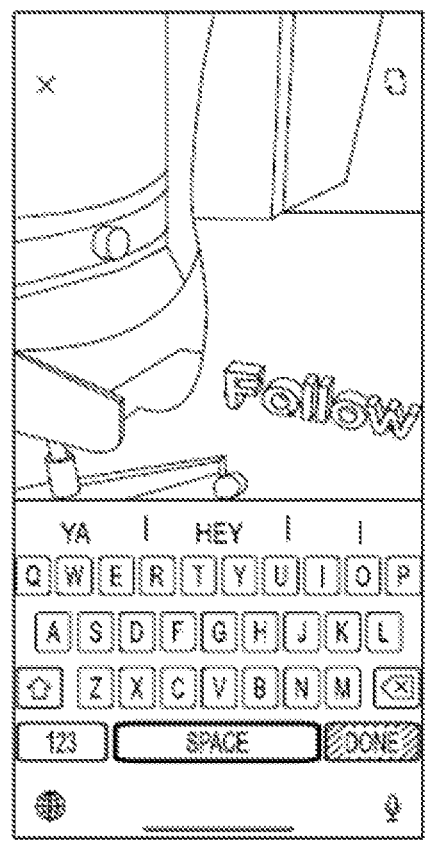

FIGS. 12A-12C illustrate an interface, which is an example of the preview interface 214. As shown in FIGS. 12A-12C, as a user is editing a 3D caption while accessing the preview interface 214, the user may move the computing device away from the caption and the DIY effects image modification system 210 is able to track the movement and force the 3D caption to follow within the 3D space captured within the camera feed of the computing device. For example, the DIY effects image modification system 210 may detect movement of the client device that causes a second 3D space to be captured in the camera feed and animate the 3D caption moving from the first 3D space to the second 3D space during the movement of the client device. In this manner, the DIY effects image modification system 210 ensures that, while editing, the 3D caption remains visible to the user until they commit a final version of the 3D caption. As shown, moving the 3D caption may be rendered with a lower opacity than remaining stationary.

Figure 13A:
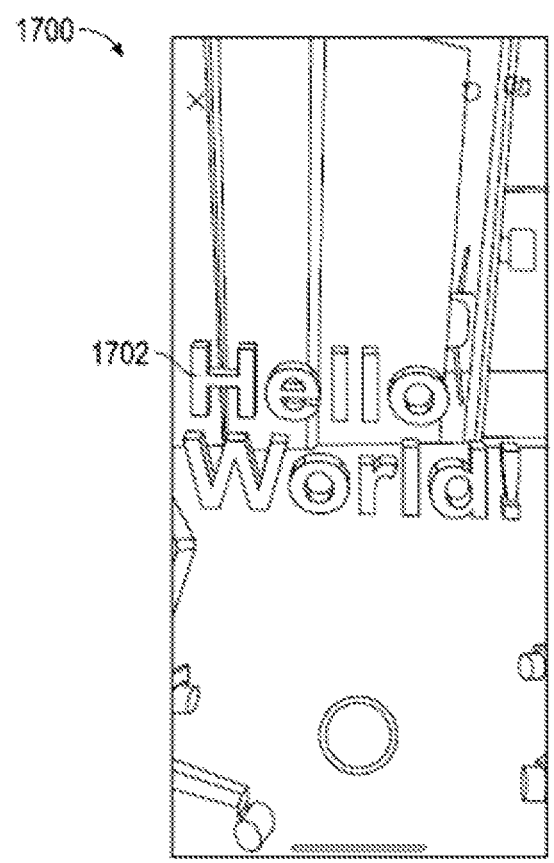
Figure 13B:
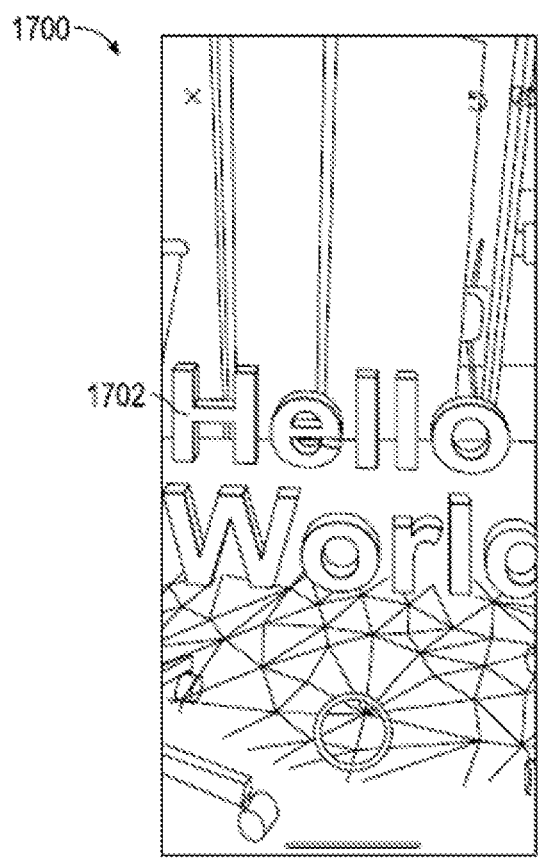

FIGS. 13A-13F are interface diagrams that illustrate an interface 1700, which is an example of a preview interface 214. As shown in FIG. 13A, a 3D caption 1702 is rendered within a 3D space at a first position; the 3D caption 1702 is rendered such that it appears attached to a reference surface 1703 (e.g., the ground). As shown in FIG. 13B, through appropriate interaction with the 3D caption 1702 (e.g., a select and drag gesture), the user may move the 3D caption 1702 such that it is rendered at a second position within the 3D space.

Figure 13C:
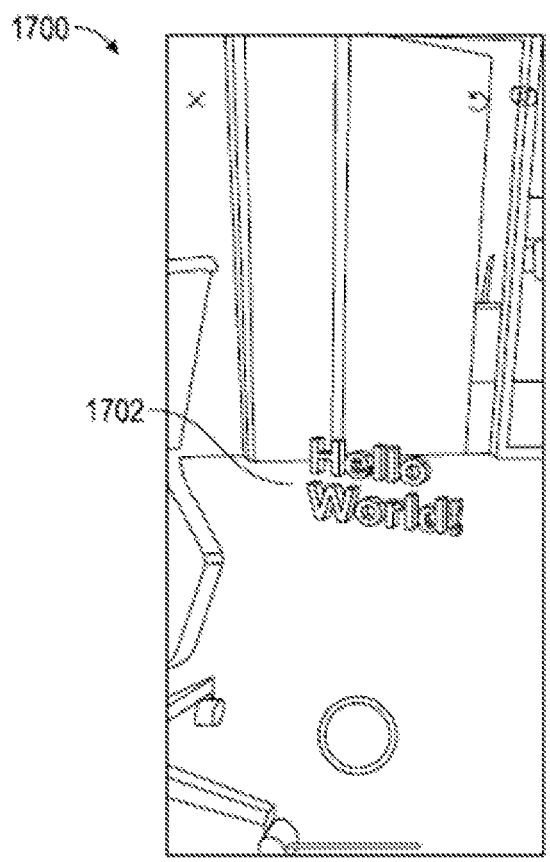
Figure 13D:
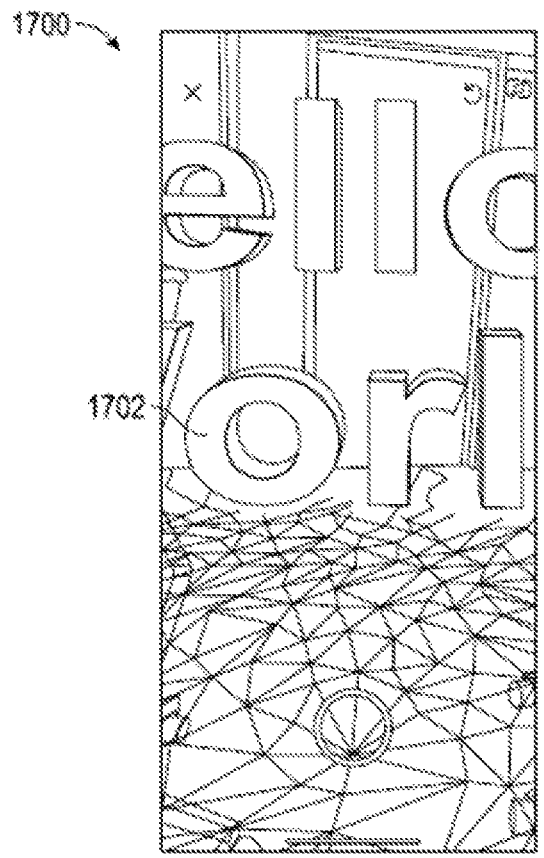
Figure 13E:
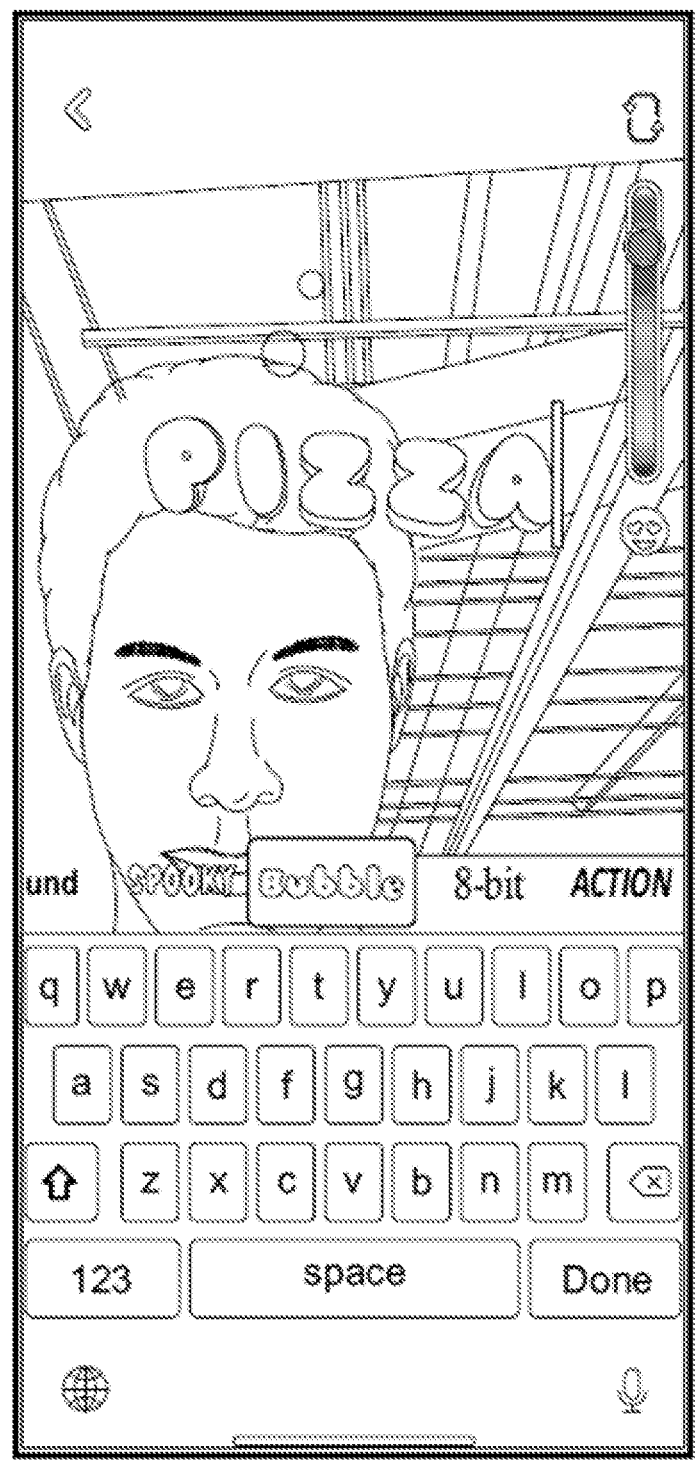
Figure 13F:
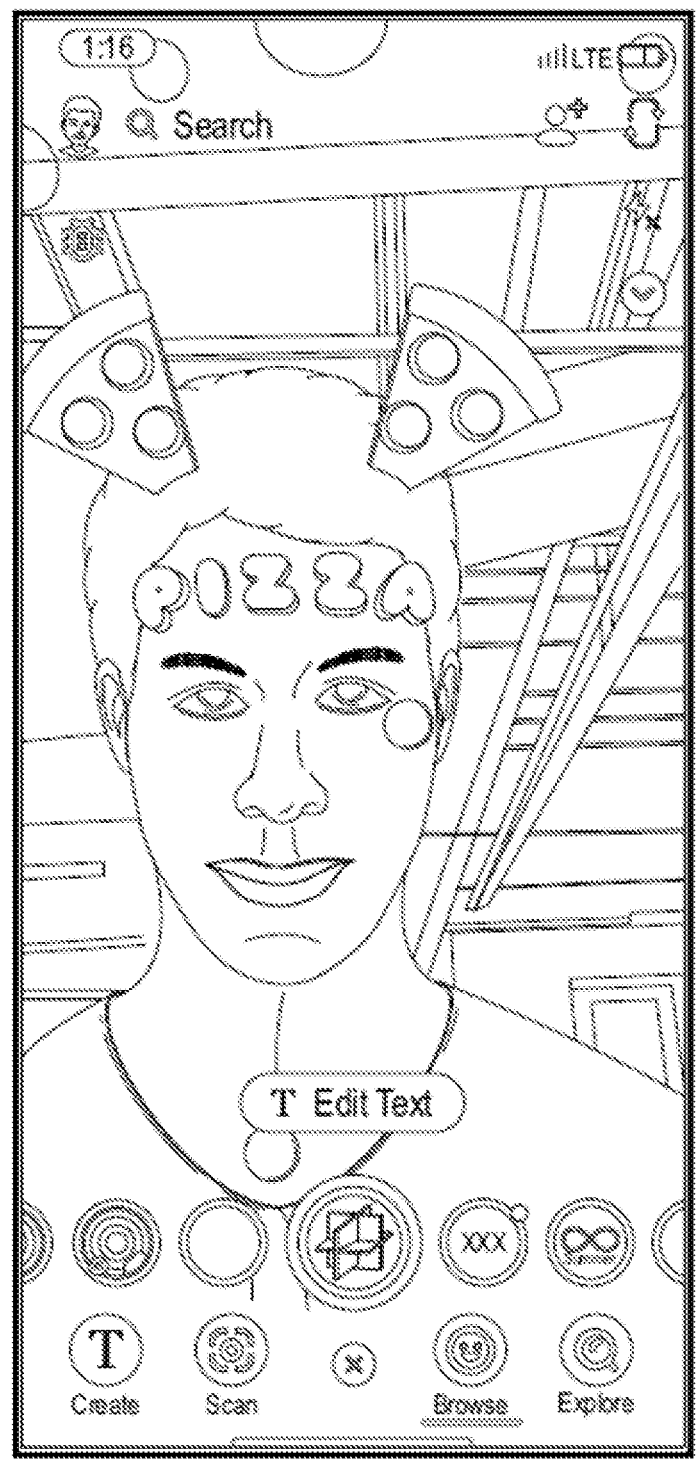

As shown in FIGS. 13C and 13D, a user may change a scale and rotation of the 3D caption 1702 through appropriate interaction with the 3D caption 1702. For example, the user can perform a pinch and rotate gesture with two fingers on an input touchscreen display on which the camera feed is displayed to scale and rotate the 3D caption 1702 on the reference surface without affecting a layout of the 3D caption 1702. As shown in FIGS. 13E and 13F, a user can input text (e.g., "PIZZA") according to specific font (e.g., Bubble font) and the 3D caption is generated and displayed on a portion of a face depicted in the camera feed.

Once the user is satisfied with the placement and look of a 3D caption, the user may create a message that includes the 3D caption and one or more images from the camera feed. For example, the user may use the client device 102 to record a video in which the 3D caption is rendered such that it appears attached to a surface in the video.

Figure 19:
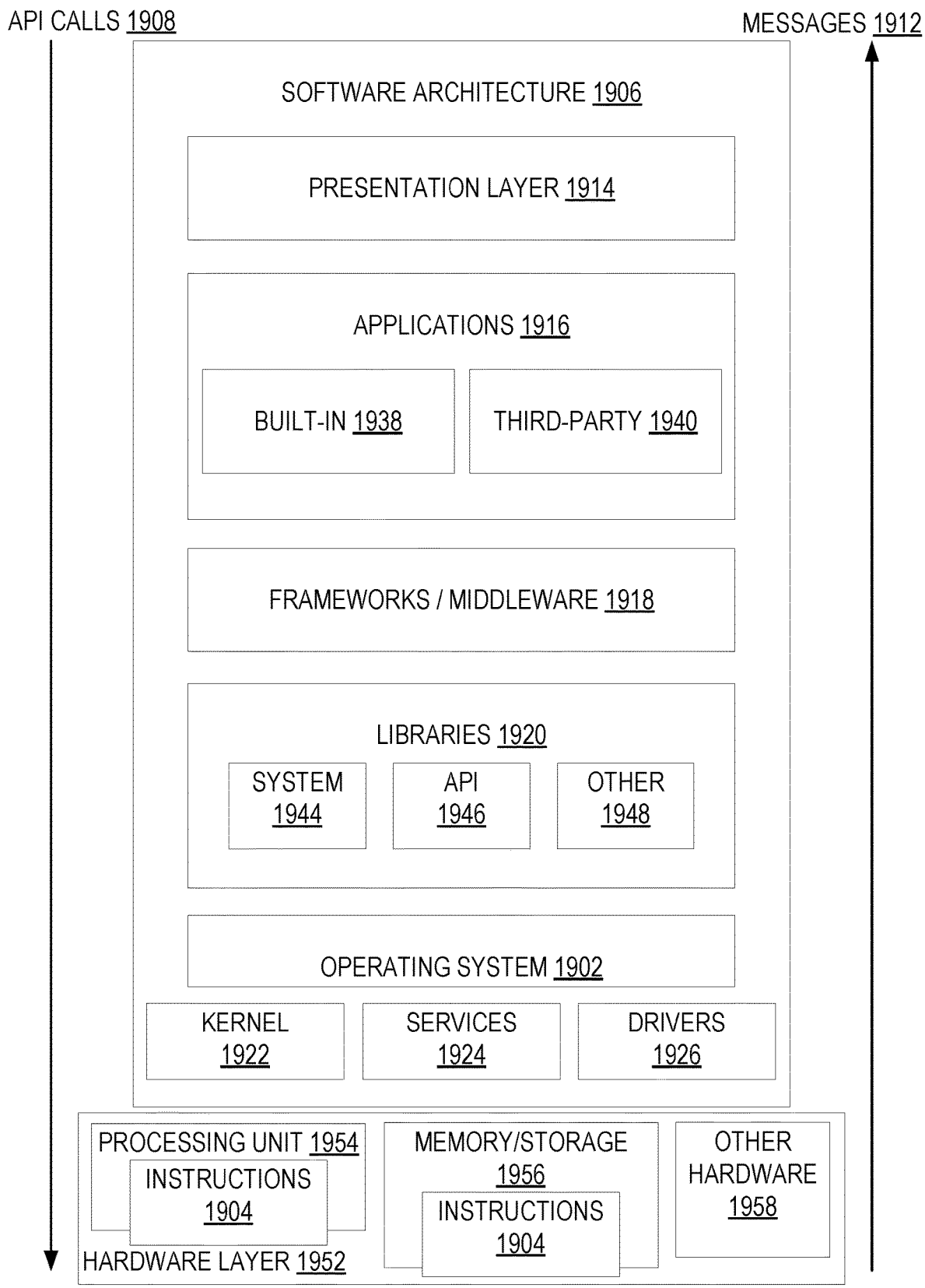
FIG. 19 is a block diagram illustrating a representative software architecture, which may be used in conjunction with various hardware architectures herein described, according to example embodiments.

FIG. 19 is a block diagram illustrating an example software architecture 1906, which may be used in conjunction with various hardware architectures herein described. FIG. 19 is a non-limiting example of a software architecture and it will be appreciated that many other architectures may be implemented to facilitate the functionality described herein. The software architecture 1906 may execute on hardware such as machine 2000 of FIG. 20 that includes, among other things, processors 2004, memory 2014, and input/output (I/O) components 2018. A representative hardware layer 1952 is illustrated and can represent, for example, the machine 2000 of FIG. 20. The representative hardware layer 1952 includes a processing unit 1954 having associated executable instructions 1904. Executable instructions 1904 represent the executable instructions of the software architecture 1906, including implementation of the methods, components, and so forth described herein. The hardware layer 1952 also includes memory and/or storage modules memory/storage 1956, which also have executable instructions 1904. The hardware layer 1952 may also comprise other hardware 1958.

In the example architecture of FIG. 19, the software architecture 1906 may be conceptualized as a stack of layers where each layer provides particular functionality. For example, the software architecture 1906 may include layers such as an operating system 1902, libraries 1920, applications 1916, frameworks/middleware 1918, and a presentation layer 1914. Operationally, the applications 1916 and/or other components within the layers may invoke API calls 1908 through the software stack and receive a response as in messages 1912 to the API calls 1908. The layers illustrated are representative in nature and not all software architectures have all layers. For example, some mobile or special purpose operating systems may not provide a frameworks/middleware 1918, while others may provide such a layer. Other software architectures may include additional or different layers.

The operating system 1902 may manage hardware resources and provide common services. The operating system 1902 may include, for example, a kernel 1922, services 1924, and drivers 1926. The kernel 1922 may act as an abstraction layer between the hardware and the other software layers. For example, the kernel 1922 may be responsible for memory management, processor management (e.g., scheduling), component management, networking, security settings, and so on. The services 1924 may provide other common services for the other software layers. The drivers 1926 are responsible for controlling or interfacing with the underlying hardware. For instance, the drivers 1926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1920 provide a common infrastructure that is used by the applications 1916 and/or other components and/or layers. The libraries 1920 provide functionality that allows other software components to perform tasks in an easier fashion than to interface directly with the underlying operating system 1902 functionality (e.g., kernel 1922, services 1924 and/or drivers 1926). The libraries 1920 may include system libraries 1944 (e.g., C standard library) that may provide functions such as memory allocation functions, string manipulation functions, mathematical functions, and the like. In addition, the libraries 1920 may include API libraries 1946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1920 may also include a wide variety of other libraries 1948 to provide many other APIs to the applications 1916 and other software components/modules.

The frameworks/middleware 1918 (also sometimes referred to as middleware) provide a higher-level common infrastructure that may be used by the applications 1916 and/or other software components/modules. For example, the frameworks/middleware 1918 may provide various graphic user interface (GUI) functions, high-level resource management, high-level location services, and so forth. The frameworks/middleware 1918 may provide a broad spectrum of other APIs that may be utilized by the applications 1916 and/or other software components/modules, some of which may be specific to a particular operating system 1902 or platform.

The applications 1916 include built-in applications 1938 and/or third-party applications 1940. Examples of representative built-in applications 1938 may include, but are not limited to, a contacts application, a browser application, a book reader application, a location application, a media application, a messaging application, and/or a game application. Third-party applications 1940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1940 may invoke the API calls 1908 provided by the mobile operating system (such as operating system 1902) to facilitate functionality described herein.

The applications 1916 may use built-in operating system functions (e.g., kernel 1922, services 1924, and/or drivers 1926), libraries 1920, and frameworks/middleware 1918 to create user interfaces to interact with users of the system. Alternatively, or additionally, in some systems interactions with a user may occur through a presentation layer, such as presentation layer 1914. In these systems, the application/component "logic" can be separated from the aspects of the application/component that interact with a user.

Figure 20:
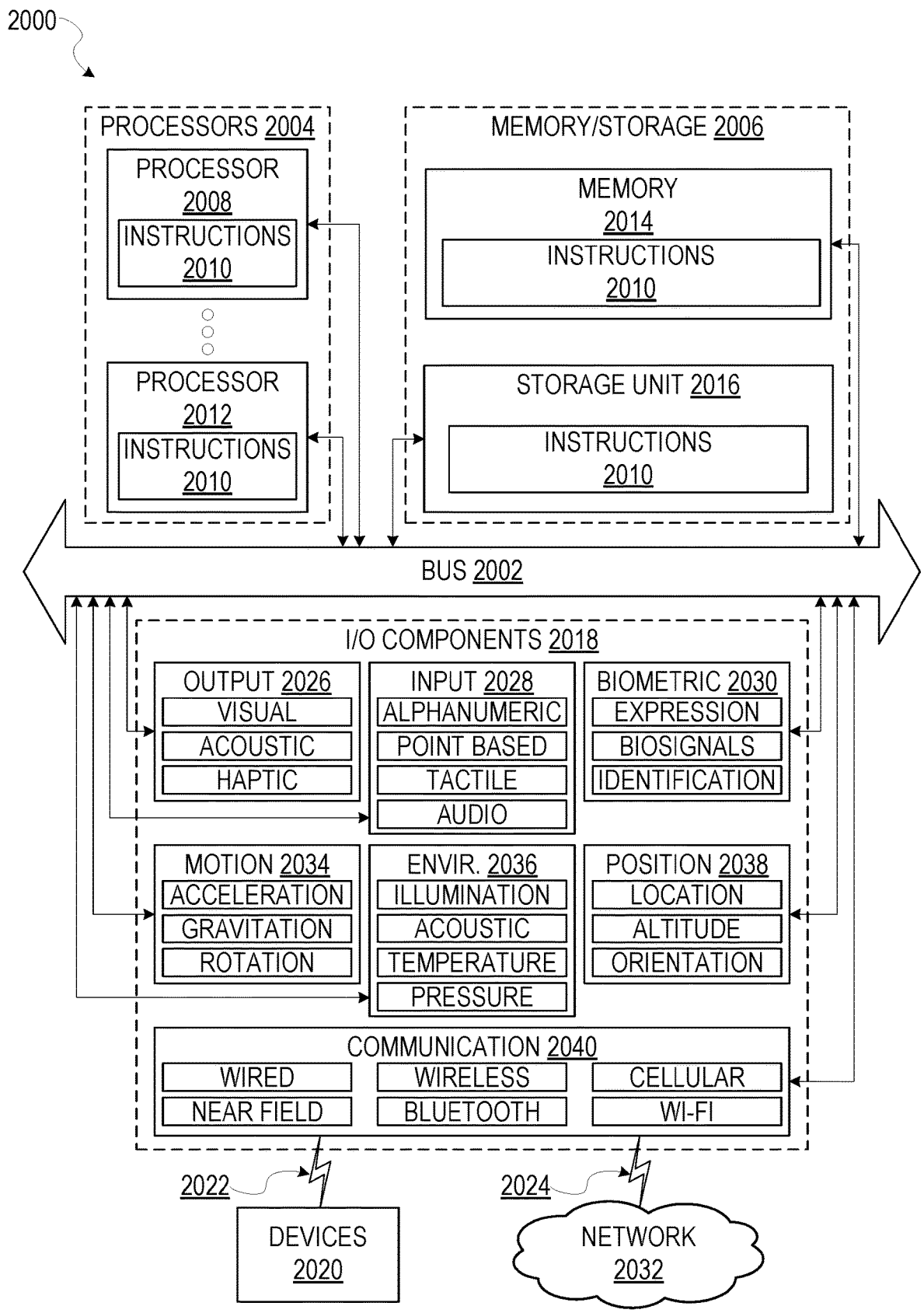
FIG. 20 is a block diagram illustrating components of a machine able to read instructions from a machine-readable medium (e.g., a machine-readable storage medium) and perform any one or more of the methodologies discussed herein, according to example embodiments.

FIG. 20 is a block diagram illustrating components of a machine 2000, according to some example embodiments, able to read instructions from a machine-readable medium (e.g., a machine-readable storage medium) and perform any one or more of the methodologies discussed herein. Specifically, FIG. 20 shows a diagrammatic representation of the machine 2000 in the example form of a computer system, within which instructions 2010 (e.g., software, a program, an application, an applet, an app, or other executable code) for causing the machine 2000 to perform any one or more of the methodologies discussed herein may be executed. As such, the instructions 2010 may be used to implement modules or components described herein. The instructions 2010 transform the general, non-programmed machine 2000 into a particular machine 2000 programmed to carry out the described and illustrated functions in the manner described. In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2010, sequentially or otherwise, that specify actions to be taken by machine 2000. Further, while only a single machine 2000 is illustrated, the term "machine" shall also be taken to include a collection of machines that individually or jointly execute the instructions 2010 to perform any one or more of the methodologies discussed herein.

The machine 2000 may include processors 2004, memory memory/storage 2006, and I/O components 2018, which may be configured to communicate with each other such as via a bus 2002. In an example embodiment, the processors 2004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2008 and a processor 2012 that may execute the instructions 2010. The term "processor" is intended to include multi-core processors 2004 that may comprise two or more independent processors (sometimes referred to as "cores") that may execute instructions 2010 contemporaneously. Although FIG. 20 shows multiple processors 2004, the machine 2000 may include a single processor with a single core, a single processor with multiple cores (e.g., a multi-core processor), multiple processors with a single core, multiple processors with multiple cores, or any combination thereof.

The memory/storage 2006 may include a memory 2014, such as a main memory, or other memory storage, and a storage unit 2016, both accessible to the processors 2004 such as via the bus 2002. The storage unit 2016 and memory 2014 store the instructions 2010 embodying any one or more of the methodologies or functions described herein. The instructions 2010 may also reside, completely or partially, within the memory 2014, within the storage unit 2016, within at least one of the processors 2004 (e.g., within the processor's cache memory), or any suitable combination thereof, during execution thereof by the machine 2000. Accordingly, the memory 2014, the storage unit 2016, and the memory of processors 2004 are examples of machine-readable media.

The I/O components 2018 may include a wide variety of components to receive input, provide output, produce output, transmit information, exchange information, capture measurements, and so on. The specific I/O components 2018 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2018 may include many other components that are not shown in FIG. 20. The I/O components 2018 are grouped according to functionality merely for simplifying the following discussion and the grouping is in no way limiting. In various example embodiments, the I/O components 2018 may include output components 2026 and input components 2028. The output components 2026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2018 may include biometric components 2030, motion components 2034, environmental components 2036, or position components 2038 among a wide array of other components. For example, the biometric components 2030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2034 may include acceleration sensor components (e.g., accelerometer), gravitation sensor components, rotation sensor components (e.g., gyroscope), and so forth. The environmental components 2036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2018 may include communication components 2040 operable to couple the machine 2000 to a network 2032 or devices 2020 via coupling 2024 and coupling 2022, respectively. For example, the communication components 2040 may include a network interface component or other suitable device to interface with the network 2032. In further examples, communication components 2040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2020 may be another machine or any of a wide variety of peripheral devices (e.g., a peripheral device coupled via a USB).

Moreover, the communication components 2040 may detect identifiers or include components operable to detect identifiers. For example, the communication components 2040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving a date and time of day, sometimes accurate to a small fraction of a second.

What is claimed is:

1. A system comprising:
   at least one hardware processor;
   a memory storing instructions which, when executed by the at least one hardware processor, cause the at least one hardware processor to perform operations comprising:
   receiving, by a messaging application, an image from a camera of a user device;
   displaying a plurality of image modification options on top of the image, the plurality of image modification options comprising a user-customizable effects option;
   receiving input that selects the user-customizable effects option, from the plurality of image modification options that are displayed on top of the image, for activating a user-customizable effects mode;
   in response to receiving the input, displaying an array of a plurality of effect options together with the image proximate to the user-customizable effects option; and
   applying a first effect associated with a first effect option of the plurality of effect options to the image.

2. The system of claim 1, wherein the image is a frame of a real-time or previously, stored video feed, and wherein the first effect is applied automatically in response to receiving the input that selects the user-customizable effects option.

3. The system of claim 1, wherein the plurality of image modification options is displayed in response to receiving a selection of a create option from a menu of options displayed together with the image.

4. The system of claim 2, further comprising operations for:
   presenting, together with the video feed, a menu of options comprising a create option; and
   displaying the plurality of image modification options comprising the user-customizable effects option in response to receiving a user selection of the create option.

5. The system of claim 4, wherein the plurality of image modification options overlays the video feed, and wherein the menu of options is displayed adjacent to the video feed.

6. The system of claim 4, wherein the plurality of image modification options includes a three-dimensional (3D) captions option to enable a user to generate a 3D caption for the video feed, a 3D cutouts option to enable a user to generate a 3D cutout of an object depicted in the video feed, and a 3D paint option to enable a user to draw in 3D using one or more paint styles over the video feed.

7. The system of claim 1, further comprising operations for:
   selecting a second effect associated with a second effect option of the plurality of effect options; and
   applying the second effect instead of the first effect to the image.

8. The system of claim 7, wherein selecting the second effect further comprises operations for:

receiving user input that scrolls the plurality of effect options within the array; and receiving user input that selects the second effect option by tapping the second effect option displayed in the array.

9. The system of claim 7, wherein selecting the second effect further comprises operations for:

receiving user input that swipes across a screen in which the image is displayed in a first direction;

determining that the second effect is adjacent to the first effect currently applied to the image in the first direction; and selecting the second effect option in response to determining that the second effect is adjacent to the first effect currently applied to the image in the first direction.

10. The system of claim 1, further comprising operations for:

receiving user input that swipes across a screen in which the image is displayed in a first direction;

determining that a second effect is adjacent to the first effect currently applied to the image in the first direction; and selecting a second effect option in response to determining that the second effect is adjacent to the first effect currently applied to the image in the first direction.

11. The system of claim 1, further comprising operations for:

displaying an option to modify an attribute of the first effect currently applied to the image; and in response to receiving input that selects the option to modify, replacing a display of the array with a slider associated with different attributes of the first effect.

12. The system of claim 1, further comprising operations for displaying an effect modification option proximate to the array, the effect modification option enabling a user to adjust an attribute of an effect currently applied to the image.

13. The system of claim 12, wherein the effect modification option comprises a first display property, further comprising operations for:

determining a type of effect modification attribute of the first effect;

selecting a second effect associated with a second effect option of the plurality of effect options;

determining that a type of effect modification attribute of the second effect is different om the type of effect modification attribute of the first effect; and modifying the display property of the effect modification option to include a second display property in response to determining that the type of effect modification attribute of the second effect is different from the type of effect modification attribute of the first effect.

14. The system of claim 12, further comprising operations for:

receiving a user selection of the effect modification option;

replacing a display of the array with a slider associated with different attributes of the first effect;

receiving user input that drags the slider to a given attribute of the different attributes; and modifying an attribute of the first effect applied to the image based on the given attribute.

15. The system of claim 14, further comprising operations for:

displaying, proximate to the slider, an icon corresponding to the user-customizable effects option, wherein the icon is displayed in place of the effect modification option; and replacing the display of the slider with the display of the array in response to receiving a user selection of the icon corresponding to the user-customizable effects option.

16. The system of claim 14, wherein the attribute that is modified comprises at least one of a color or intensity of the effect.

17. The system of claim 1, wherein the plurality of effect options includes at least one of a sunburn effect option, an old fashion effect option, a frost effect option, a neon effect option, a square effect option, a postcard effect option, an antenna effect option, a moire effect option, a CCTV effect option, a circle effect option, a heart effect option, a rectangle effect option, a bokeh effect option, a flare effect option, and a love effect option.

18. A method comprising:

receiving, by a messaging application, an image from a camera of a user device;

displaying a plurality of image modification options on top of the image, the plurality of image modification options comprising a user-customizable effects option;

receiving input that selects the user-customizable effects option, from the plurality of image modification options that are displayed on top of the image, for activating a user-customizable effects mode;

in response to receiving the input, displaying an array of a plurality of effect options together with the image proximate to the user-customizable effects option; and applying a first effect associated with a first effect option of the plurality of effect options to the image.

19. The method of claim 18, wherein the plurality of age modification options is displayed in response to receiving a selection of a create option from a menu of options displayed together with the image.

20. A non-transitory machine-readable medium storing instructions which, when executed by one or more processors of a machine, cause the machine to perform operations comprising:

receiving, by a messaging application, an image from a camera of a user device;

displaying a plurality of image modification options on top of the image, the plurality of image modification options comprising a user-customizable effects option;

receiving input that selects the user-customizable effects option, from the plurality of image modification options that are displayed on top of the image, for activating a user-customizable effects mode;

in response to receiving the input, displaying an array of a plurality of effect options together with the image proximate to the user-customizable effects option; and applying a first effect associated with a first effect option of the plurality of effect options to the image.

* * * * *